United States Patent
Goro et al.

(10) Patent No.: US 9,064,444 B2
(45) Date of Patent: Jun. 23, 2015

(54) THREE-DIMENSIONAL DISPLAY DEVICE

(71) Applicant: Samsung Display Co., Ltd., Yongin (KR)

(72) Inventors: Hamagishi Goro, Hwaseong-si (KR); Seung Jun Yu, Suwon-si (KR); Sang Min Jeon, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 210 days.

(21) Appl. No.: 13/683,040

(22) Filed: Nov. 21, 2012

(65) Prior Publication Data

US 2013/0321482 A1    Dec. 5, 2013

(30) Foreign Application Priority Data

May 31, 2012    (KR) .................. 10-2012-0058613

(51) Int. Cl.
*G09G 5/10*    (2006.01)
*G09G 3/00*    (2006.01)
*H04N 13/04*    (2006.01)

(52) U.S. Cl.
CPC .............. *G09G 5/10* (2013.01); *G09G 2380/00* (2013.01); *G09G 3/003* (2013.01); *H04N 13/0413* (2013.01); *H04N 13/0409* (2013.01); *H04N 13/0447* (2013.01); *H04N 13/0452* (2013.01); *H04N 13/0475* (2013.01); *H04N 13/0477* (2013.01); *H04N 13/0497* (2013.01)

(58) Field of Classification Search
CPC . G09G 2380/00; G09G 5/10; H04N 13/0033; H04N 2213/002; H04N 13/0413; G02B 27/2214

USPC ....................... 345/690, 6; 359/464
See application file for complete search history.

(56) References Cited

U.S. PATENT DOCUMENTS

| | | | |
|---|---|---|---|
| 5,855,425 A * | 1/1999 | Hamagishi ................ 353/7 |
| 7,505,203 B2 * | 3/2009 | Nam et al. .............. 359/464 |
| 7,682,026 B2 | 3/2010 | Huffman et al. | |
| 8,482,485 B2 * | 7/2013 | Jang et al. ................ 345/6 |
| 2005/0168815 A1 | 8/2005 | Maruyama et al. | |
| 2005/0190443 A1 * | 9/2005 | Nam et al. .............. 359/464 |
| 2009/0201362 A1 | 8/2009 | Shestak et al. | |
| 2011/0051239 A1 * | 3/2011 | Daiku ..................... 359/464 |

FOREIGN PATENT DOCUMENTS

| | | |
|---|---|---|
| JP | 10-161062 | 6/1998 |
| JP | 10-221646 | 8/1998 |
| JP | 11-088914 | 3/1999 |
| JP | 2001-095014 | 4/2001 |

(Continued)

*Primary Examiner* — Dwayne Bost
*Assistant Examiner* — Chineyere Wills-Burns
(74) *Attorney, Agent, or Firm* — H.C. Park & Associates, PLC

(57) ABSTRACT

A 3D image display device including a position detector, a display panel, a barrier panel, and a barrier panel controller. The position detector detects a position of a viewer and generates a selection signal. The display panel includes a plurality of pixels and alternately displays a left-eye image and a right-eye image. The barrier panel includes a light transmitting portion and a light blocking portion. The barrier panel controller controls a width of each of the light transmitting portion and the light blocking portion. The barrier panel is operated in one of a first mode, a second mode, and a third mode.

27 Claims, 17 Drawing Sheets

(56) References Cited

FOREIGN PATENT DOCUMENTS

| JP | 3229824 | 11/2001 |
| JP | 3668116 | 7/2005 |
| JP | 2006-197036 | 7/2006 |
| JP | 4034794 | 1/2008 |
| JP | 4440066 | 3/2010 |
| JP | 2010-273013 | 12/2010 |
| KR | 10-0505334 | 7/2005 |
| KR | 10-2007-0045533 | 5/2007 |

* cited by examiner

Fig. 11A

| COL1 | COL2 | COL3 | COL4 |
|------|------|------|------|
| R1   | R2   | L1   | L2   |

Fig. 11B

| COL1 | COL2 | COL3 | COL4 |
|------|------|------|------|
| L2   | R1   | R2   | L1   |

Fig. 11C

| COL1 | COL2 | COL3 | COL4 |
|------|------|------|------|
| L1   | L2   | R1   | R2   |

Fig. 11D

| COL1 | COL2 | COL3 | COL4 |
|------|------|------|------|
| R2   | L1   | L2   | R1   |

Fig. 16A

| COL1 | COL2 | COL3 | COL4 |
|---|---|---|---|
| R1 | L1 | R2 | L2 |

Fig. 16B

| COL1 | COL2 | COL3 | COL4 |
|---|---|---|---|
| L2 | R1 | L1 | R2 |

Fig. 16C

| COL1 | COL2 | COL3 | COL4 |
|---|---|---|---|
| R2 | L2 | R1 | L1 |

Fig. 16D

| COL1 | COL2 | COL3 | COL4 |
|---|---|---|---|
| L1 | R2 | L2 | R1 |

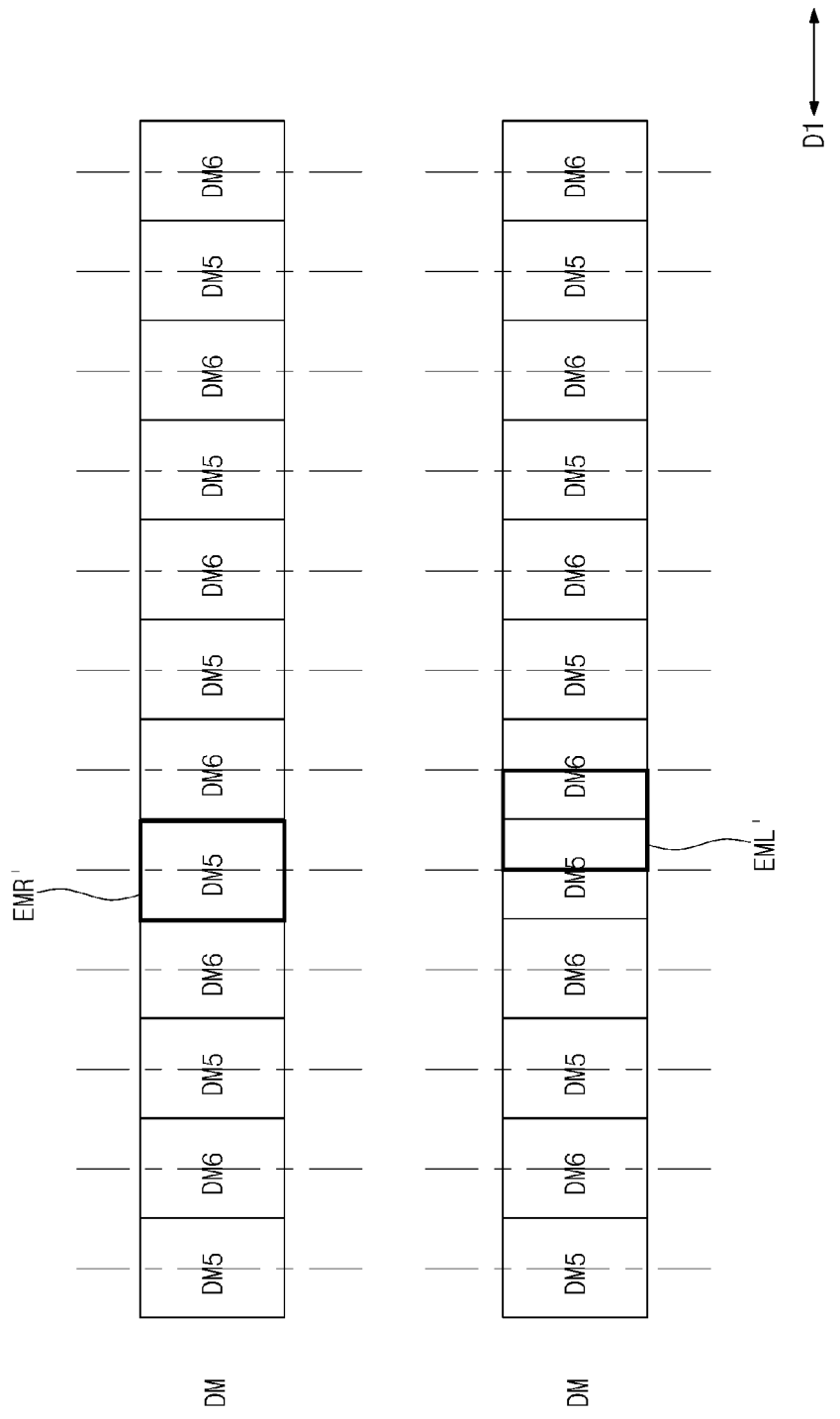

THREE-DIMENSIONAL DISPLAY DEVICE

CROSS-REFERENCE TO RELATED APPLICATION

This U.S. non-provisional patent application claims priority from and the benefit of Korean Patent Application No. 10-2012-0058613, filed on May 31, 2012, which is hereby incorporated by reference for all purposes as if fully set forth herein.

BACKGROUND

1. Field

Exemplary embodiments of the present disclosure relate to a three-dimensional (3D) display device and, more particularly, a 3D display device capable of displaying a 3D image without using glasses.

2. Discussion of the Background

In general, a 3D image display device displays a 3D image using a stereoscopic technique or an auto stereoscopic technique.

The stereoscopic technique is classified as either a glass type method or a glass-less type method. The glass type method changes a polarization direction of light involved in each of left and right images or displays the left image and the right image with a predetermined time interval to provide the 3D image to a viewer.

The glass-less type method includes a barrier panel in order to separate optical axes of the left image and the right image. The display device employing the barrier panel provides the left image and the right image to left and right eyes of the viewer, respectively, through a light transmitting portion formed through the barrier panel.

In the barrier panel of the display device, the light transmitting portion has a fixed size and a fixed position. Accordingly, the display device provides the 3D image to the viewer only at a specific focal length.

SUMMARY

Exemplary embodiments of the present invention provide a glassless type display device capable of providing various focal lengths to a viewer in a 3D mode.

Additional features of the invention will be set forth in the description which follows, and in part will be apparent from the description, or may be learned by practice of the invention.

An exemplary embodiment of the present invention discloses a 3D image display device includes a position detector, a display panel, a barrier panel, and a barrier panel controller. The position detector detects a position of a viewer and generates a selection signal. The display panel includes a plurality of pixels and alternately displays a left-eye image and a right-eye image in a first direction. The barrier panel is disposed corresponding to the display panel and includes a light transmitting portion and a light blocking portion. The barrier panel controller controls the barrier panel and the barrier panel is operated in one of first, second, and third modes.

The barrier panel operated in the first mode includes a first light transmitting portion and a first light blocking portion, the barrier panel operated in the second mode includes a second light transmitting portion and a second light blocking portion, and the barrier panel operated in the third mode includes a third light transmitting portion and a third light blocking portion.

The first light transmitting portion and the first light blocking portion have a second width in the first direction. The second light transmitting portion has a width corresponding to a half of the second width in the first direction and the second light blocking portion has a width three times greater than the first width in the first direction. The third light transmitting portion and the third light blocking portion have the first width in the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 11A, FIG. 11B, FIG. 11C, and FIG. 11D are plan views showing a portion of the display panel when the barrier panel is operated in the second mode.

FIG. 16A, FIG. 16B, FIG. 16C, and FIG. 16D are plan views showing a portion of the display panel when the barrier panel is operated in the third mode.

FIG. 17 is a view showing an appropriate visible image when the distance between the viewer and the barrier panel is two times greater than the appropriate visible distance.

DETAILED DESCRIPTION OF THE ILLUSTRATED EMBODIMENTS

Figure 1:
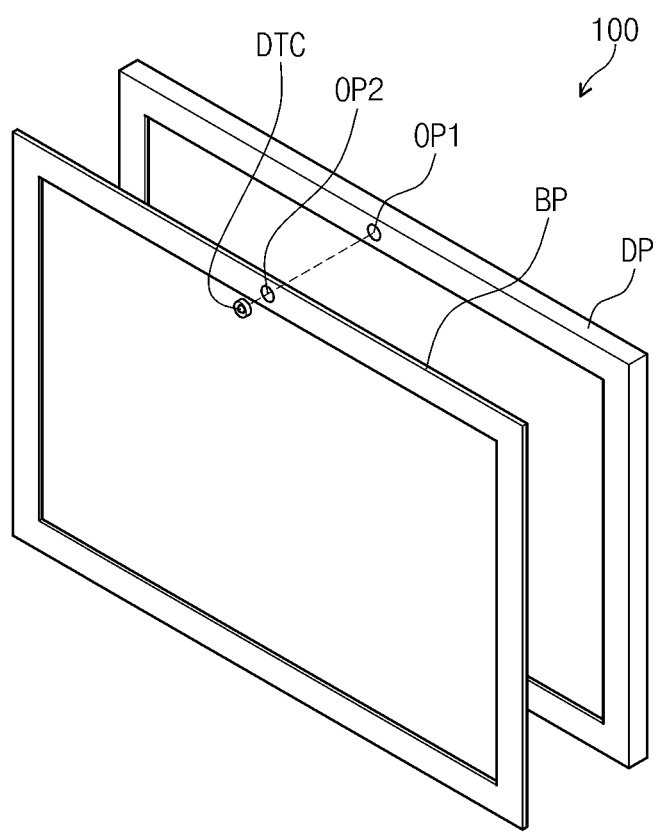
FIG. 1 is an exploded perspective view showing a display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, directly connected to, or directly coupled to the other element or layer, or intervening elements or layers may be present. In contrast, when an element is referred to as being "directly on," "directly connected to" or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ). As used herein, the term "and/or" includes any and all combinations of one or more of the associated listed items.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
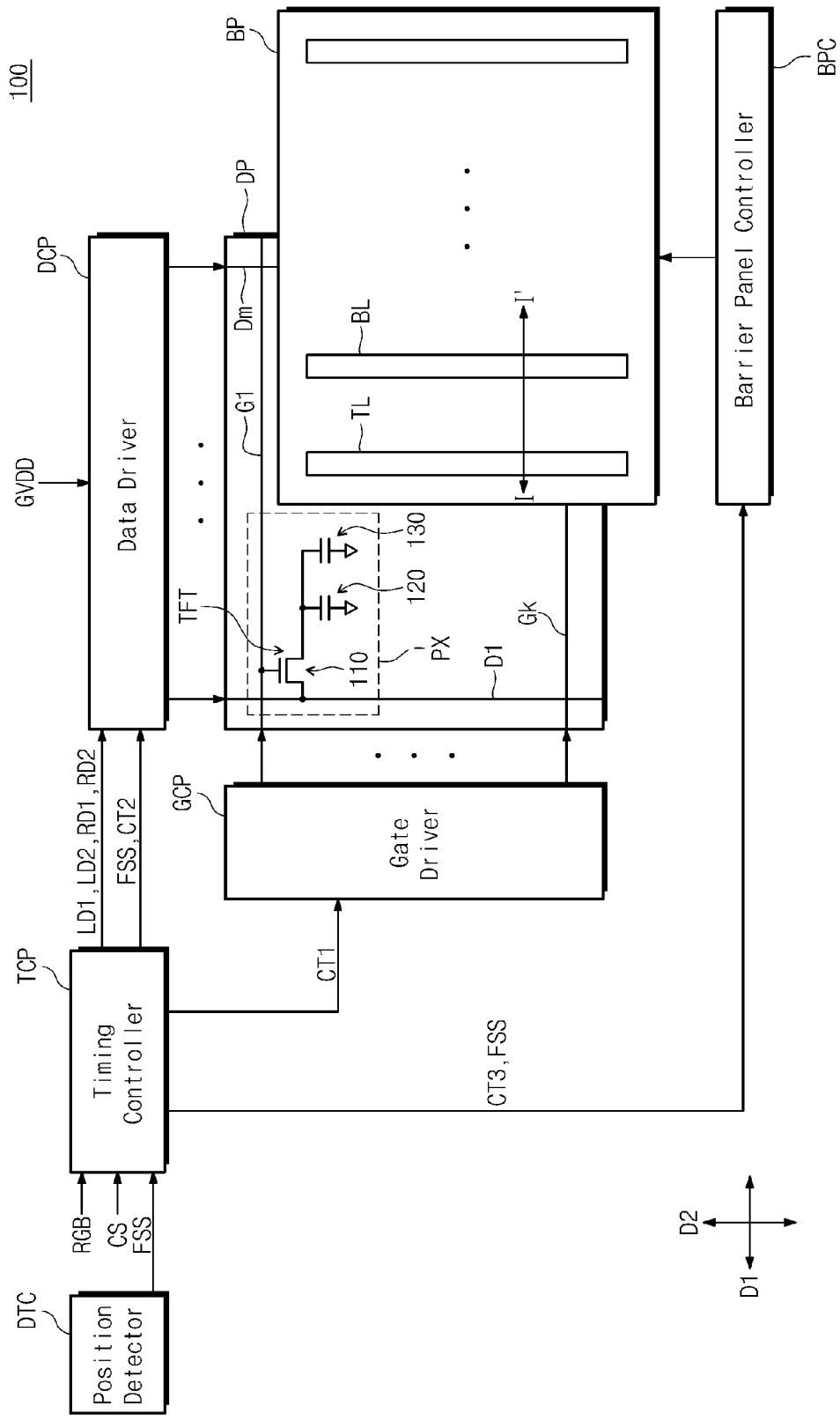
FIG. 2 is a block diagram of the display device shown in FIG. 1.

FIG. 1 is an exploded perspective view showing a display device according to an exemplary embodiment of the present invention, and FIG. 2 is a block diagram showing the display device shown in FIG. 1.

Referring to FIGS. 1 and 2, the display device 100 includes a display panel DP, a barrier panel BP, a position detector DTC, and a driver.

The display panel DP is operated in a 2D mode or a 3D mode in response to a signal inputted by a viewer. The display panel DP displays a 2D image during the 2D mode and displays a 3D image during the 3D mode.

Hereinafter, the display panel DP operated in the 3D mode will be described in detail, and a description of the 2D mode of the display panel DP will be omitted.

The display panel DP may be one of various kinds of display panels, such as a liquid crystal display panel, a plasma display panel, an organic light emitting display panel, an electrophoretic display panel, an electrowetting display panel, etc.

In the present exemplary embodiment, as a representative example, the liquid crystal display panel that includes two substrates and a liquid crystal layer disposed between the two substrates will be described as the display panel DP. Although not shown in FIGS. 1 and 2, the display device employing the liquid crystal display panel further includes a pair of polarizing plates facing each other while interposing the liquid crystal display panel therebetween and a backlight unit providing light to the liquid crystal display panel.

The display panel DP includes a plurality of gate lines G1 to Gk, which are configured to receive a gate signal, and a plurality of data lines D1 to Dm, which are configured to receive a data voltage. The gate lines G1 to Gk are insulated from the data lines D1 to Dm while crossing the data lines D1 to Dm. The display panel 100 includes a plurality of pixel areas arranged in a matrix form and pixels are arranged in the pixel areas, respectively. FIG. 2 shows an equivalent circuit of one pixel PX. The pixel PX includes a thin film transistor 110, a liquid crystal capacitor 120, and a storage capacitor 130. The display panel DP includes a plurality of pixel columns, each of which includes a plurality of pixels PX arranged in a second direction D2. The display panel DP alternately displays a left image and a right image in a first direction D1.

Although not shown in figures, the thin film transistor 110 includes a gate electrode, a source electrode, and a drain electrode. The gate electrode is connected to a first gate line G1 among the gate lines G1 to Gk. The source electrode is connected to a first data line D1 among the data lines D1 to Dm. The drain electrode is connected to the liquid crystal capacitor 120 and the storage capacitor 130. The liquid crystal capacitor 120 and the storage capacitor 130 are connected to the drain electrode in parallel.

In addition, the display panel DP includes a first display substrate, a second display substrate facing the first display substrate, and a liquid crystal layer interposed between the first display substrate and the second display substrate.

The gate lines G1 to Gk, the data lines D1 to Dm, the thin film transistor 110, and a pixel electrode (not shown) that serves as a first electrode of the liquid crystal capacitor 120 are disposed on the first display substrate. The thin film transistor 110 applies the data voltage to the pixel electrode in response to the gate signal.

A common electrode (not shown) that serves as a second electrode of the liquid crystal capacitor 120 is disposed on the second display substrate and a reference voltage is applied to the common electrode. The liquid crystal layer serves as a dielectric substance disposed between the pixel electrode and the common electrode. The liquid crystal capacitor 120 is charged with a voltage corresponding to an electric potential difference between the data voltage and the reference voltage.

The barrier panel BP is disposed corresponding to the display panel DP and includes a light transmitting portion TL and a light blocking portion BL. Positions and sizes of the light transmitting portion TL and the light blocking portion BL are controlled by the barrier panel controller BPC.

The position detector DTC detects a position of the viewer and outputs a selection signal FSS including information about the position of the viewer. The selection signal FSS includes information regarding a distance between the viewer and the barrier panel BP and information about positions of the left and right eyes of the viewer in the first direction D1.

The position detector DTC may be, but is not limited to, a real-time camera, an infrared ray sensor, etc.

In the present exemplary embodiment, the position detector DTC shown in FIG. 1 is the real-time camera and is built into the display panel DP and the barrier panel BP. The position detector DTC may take a picture of the viewer through a first opening OP1 formed through the display panel DP and a second opening OP2 formed through the barrier panel BP to correspond to the first opening OP1.

The driver includes a timing controller TCP, a gate driver GCP, a data driver DCP, and a barrier panel controller BPC.

The timing controller TCP receives image signals RGB and control signals CS from an external graphic controller (not shown) and the selection signal FSS from the position detector DTC. The image signals RGB may include signals corresponding to a 2D image.

The timing controller TCP generates left-eye data and right-eye data on the basis of the image signals RGB and provides the left-eye data and the right-eye data to the data driver DCP. The left-eye data includes a first left-eye data LD1 and a second left-eye data LD2 and the right-eye data includes a first right-eye data RD1 and a second right-eye data RD2.

The timing controller TCP generates a first control signal CT1, a second control signal CT2, and a third control signal CT3 based on the control signals CS, such as a vertical synchronization signal, a horizontal synchronization signal, a main clock, a data enable signal, etc.

The first control signal CT1 is used to control the operation of the gate driver GCP. The first control signal CT1 includes a vertical start signal that starts the operation of the gate driver GCP, a gate clock signal that determines an output timing of a gate voltage, an output enable signal that determines an on-pulse width of the gate voltage, and a 3D synchronization signal, etc.

The second control signal CT2 is used to control the operation of the data driver DCP. The second control signal CT2 includes a horizontal start signal that starts the operation of the data driver DCP, an inversion signal that inverts a polarity of the data voltage, an output indicating signal that determines an output timing of the data voltage from the data driver DCP, and the 3D synchronization signal, etc.

The third control signal CT3 may include a 3D synchronization signal to synchronize the barrier panel BP with the display panel DP. The third control signal CT3 is applied to the barrier panel controller BPC.

The timing controller TCP applies the selection signal FSS to the data driver DCP and the barrier panel controller BPC.

The gate driver GCP is electrically connected to the gate lines G1 to Gk included in the display panel DP to apply the gate signal to the gate lines G1 to Gk. In detail, the gate driver GCP generates the gate signal on the basis of the first control signal CT1 to drive the gate lines G1 to Gk and sequentially applies the gate signal to the gate lines G1 to Gk for at least one line unit.

The data driver DCP converts the first left-eye data LD1, the second left-eye data LD2, the first right-eye data RD1, and the second right-eye data RD2 into a first left-eye data voltage, a second left-eye data voltage, a first right-eye data voltage, and a second right-eye data voltage, respectively, and outputs the first left-eye data voltage, the second left-eye data voltage, the first right-eye data voltage, and the second right-eye data voltage to the data lines D1 to Dm. The data driver DCP may change the data lines D1 to Dm having the first left-eye data voltage, the second left-eye data voltage, the first right-eye data voltage, and the second right-eye data voltage applied thereto on the basis of the selection signal FSS.

The barrier panel controller BPC controls the positions and sizes of the light transmitting portion TL and the light blocking portion BL on the basis of the selection signal FSS.

The barrier panel controller BPC controls the barrier panel BP to be operated in the first mode, the second mode, or the third mode. The barrier panel BP includes a first light transmitting portion TL1 and a first light blocking portion BL1 in the first mode; a second light transmitting portion TL2 and a second light blocking portion BL2 in the second mode; and a third light transmitting portion TL3 and a third light blocking portion BL3 in the third mode.

The first light transmitting portion TL1 has a second width in the first direction D1. The second light transmitting portion TL2 has a first width corresponding to a half of the second width in the first direction D1, and the first width of the second light transmitting portion TL2 in the first direction D1 is different from a width of the second light blocking portion BL2 in the first direction D1. The third light transmitting portion TL3 has the first width in the first direction D1, and the first width of the third light transmitting portion TL3 in the first direction D1 is the same as a width of the third light blocking portion BL3 in the first direction D1.

Figure 3:
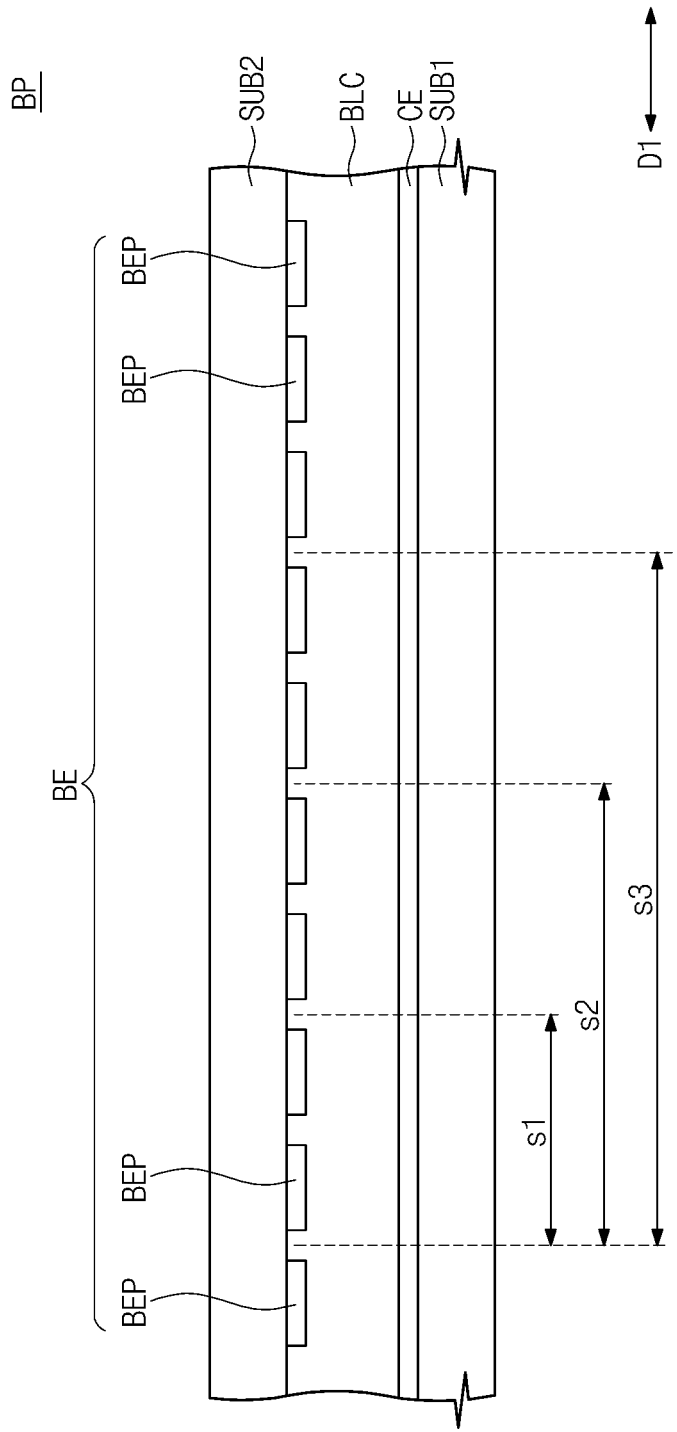
FIG. 3 is a cross-sectional view taken along a line I-I' to show a barrier panel shown in FIG. 2.

FIG. 3 is a cross-sectional view taken along a line I-I' to show a barrier panel shown in FIG. 2.

The barrier panel BP includes a first barrier substrate SUB1, a second barrier substrate SUB2 facing the first base substrate SUB1, a reference electrode CE, a barrier electrode BE, and a barrier liquid crystal layer BLC.

The reference electrode CE is disposed over the entire surface of the first barrier substrate SUB1. A constant first voltage is applied to the reference electrode CE.

The barrier electrode BE is disposed on the second barrier substrate SUB2 facing the first barrier substrate SUB1. The barrier electrode BE includes a plurality of barrier electrode patterns BEP. The barrier electrode patterns are spaced apart from each other in the first direction D1 and have the same width. Each of the barrier electrode patterns BEP is individually controlled. In detail, because the barrier electrode patterns BEP are spaced apart from each other, a separate voltage is applied to each barrier electrode BEP. A first voltage or a second voltage different from the first voltage may be applied to each barrier electrode BEP.

The first barrier substrate SUB1 and the second barrier substrate SUB2 may include a transparent member, such as a glass or plastic. The reference electrode CE and the barrier electrode BE may include a transparent conductive material.

The barrier liquid crystal layer BLC is disposed between the first barrier substrate SUB1 and the second barrier substrate SUB2. The barrier liquid crystal layer BLC is controlled by an electric field generated between the barrier electrode BE and the reference electrode CE to transmit or block light incident into the first base substrate SUB1.

In the present exemplary embodiment, the barrier liquid crystal layer BLC shown in FIG. 3 is normally operated in a black mode. Accordingly, when the first voltage is applied to the barrier electrode BE and the reference electrode CE, the barrier liquid crystal layer BLC blocks the light incident into the first base substrate SUB1. The barrier liquid crystal layer BLC may instead be normally operated in a white mode.

The first to third light transmitting portions are formed by applying the second voltage to the barrier electrode patterns BEP. As shown in FIG. 3, the first light transmitting portion is formed by applying the second voltage to four successive barrier electrode patterns BEP, and each of the second and third light transmitting portions is formed by applying the second voltage to two successive barrier electrode patterns BEP.

The first to third light blocking portions are formed by applying the first voltage to the barrier electrode patterns BEP. As shown in FIG. 3, the first light blocking portion is formed by applying the first voltage to four successive barrier electrode patterns BEP, the second light blocking portion is formed by applying the first voltage to six successive barrier electrode patterns BEP, and the third light blocking portion is formed by applying the first voltage to two successive barrier electrode patterns BEP.

In FIG. 3, a width corresponding to the two successive barrier electrode patterns BEP in the first direction D1 is referred to as "s1": a width corresponding to the four successive barrier electrode patterns BEP in the first direction D1 is referred to as "s2"; and a width corresponding to the six successive barrier electrode patterns BEP in the first direction D1 is referred to as "s3".

Because the voltage is separately applied to each barrier electrode pattern BEP, the first to third light transmitting portions and the first to third light blocking portions may move in the first direction D1 by s1/2 or s2/4.

Referring to FIGS. 2 and 3, the barrier panel controller BPC controls the positions of the light transmitting portions and the light blocking portions in the first direction D1 in the unit of s1/2 or s2/4 in response to the selection signal FSS. Particularly, in a case in which the viewer moves in the first direction D1, the barrier panel controller BPC controls the light transmitting portions and the light blocking portions to allow the positions of the light transmitting portions and the light blocking portions in the first direction D1 to correspond to the viewer. Thus, the viewer may perceive the 3D image regardless of the movement in the first direction D1 when a distance between the viewer and the barrier panel BP is constant.

Figure 4:
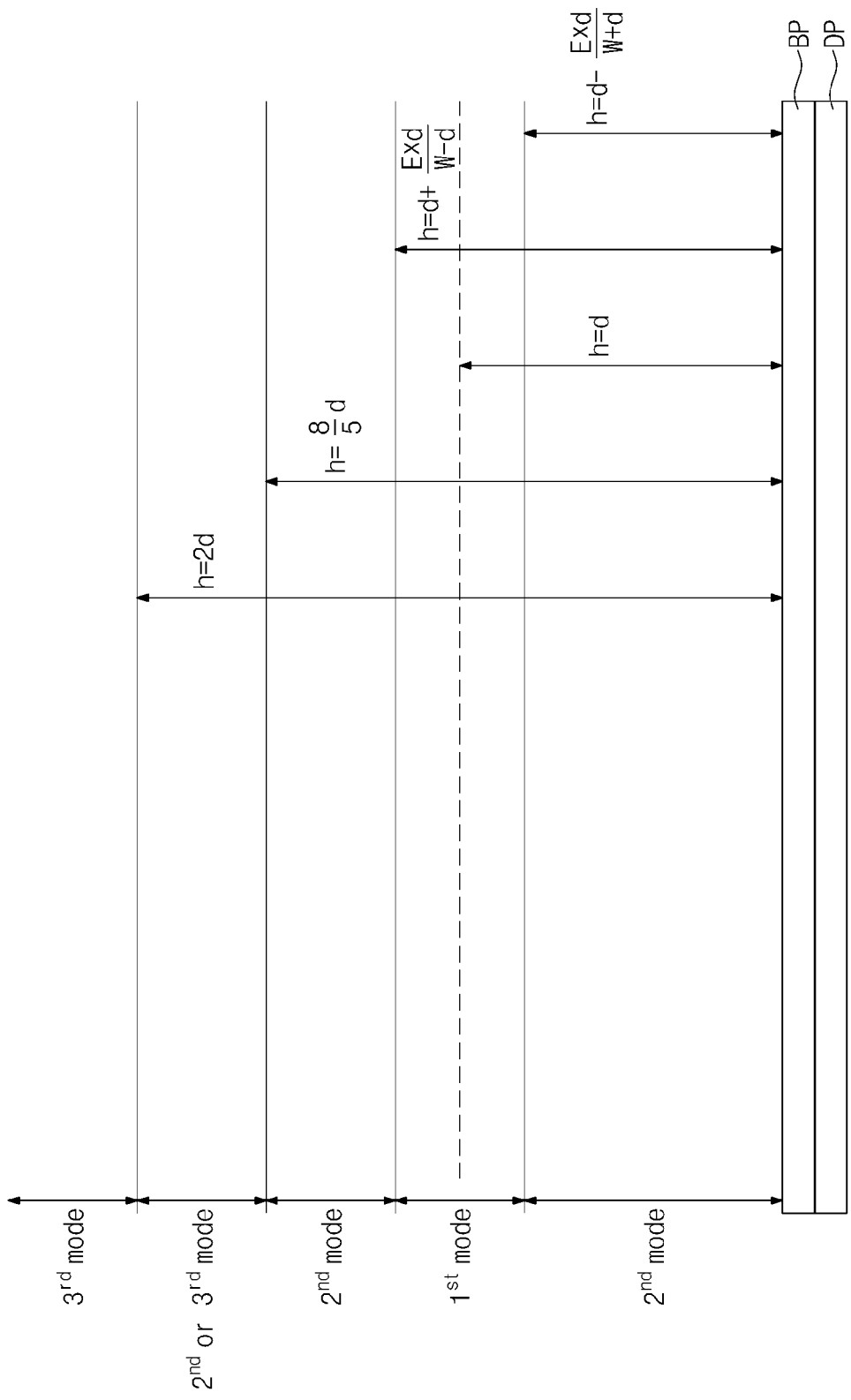
FIG. 4 is a view showing an operation range of first, second, and third modes in accordance with positions of a viewer.

FIG. 4 is a view showing an operation range of first, second, and third modes in accordance with positions of a viewer.

Referring to FIG. 4, when the distance between the viewer and the barrier panel BP satisfies the following Equation 1, the barrier panel BP is operated in the first mode. When the distance between the viewer and the barrier panel BP satisfies the following Equations 2 and 3, the barrier panel BP is operated in the second mode, and the barrier panel BP is operated in the third mode when the distance between the viewer and the barrier panel BP satisfies the following Equation 4.

$$d - \frac{E \times d}{W + d} \leq h \leq d + \frac{E \times d}{W - d} \quad \text{Equation 1}$$

$$h < d - \frac{E \times d}{W + E} \quad \text{Equation 2}$$

$$d + \frac{E \times d}{W - E} < h \leq \frac{8d}{5} \quad \text{Equation 3}$$

$$d + \frac{E \times d}{W - E} < 2d \leq h \quad \text{Equation 4}$$

In Equations 1 to 4, h denotes the distance between the viewer and the barrier panel BP, d denotes an appropriate visible distance, E denotes a distance between the left-eye and the right-eye of the viewer, and W denotes a width of the pixel columns in the first direction D1. The appropriate visible distance d denotes a distance between an upper surface of the barrier panel BP and a position on a straight line extended in a direction normal to the upper surface of the barrier panel BP.

Hereinafter, the barrier panel BP operated in the first, second, and third modes will be described in detail.

Figure 5:
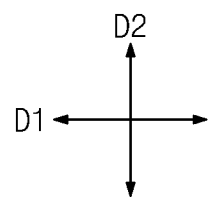
FIG. 5 is a plan view showing a portion of the display panel when the barrier panel is operated in the first mode.
Figure 6:
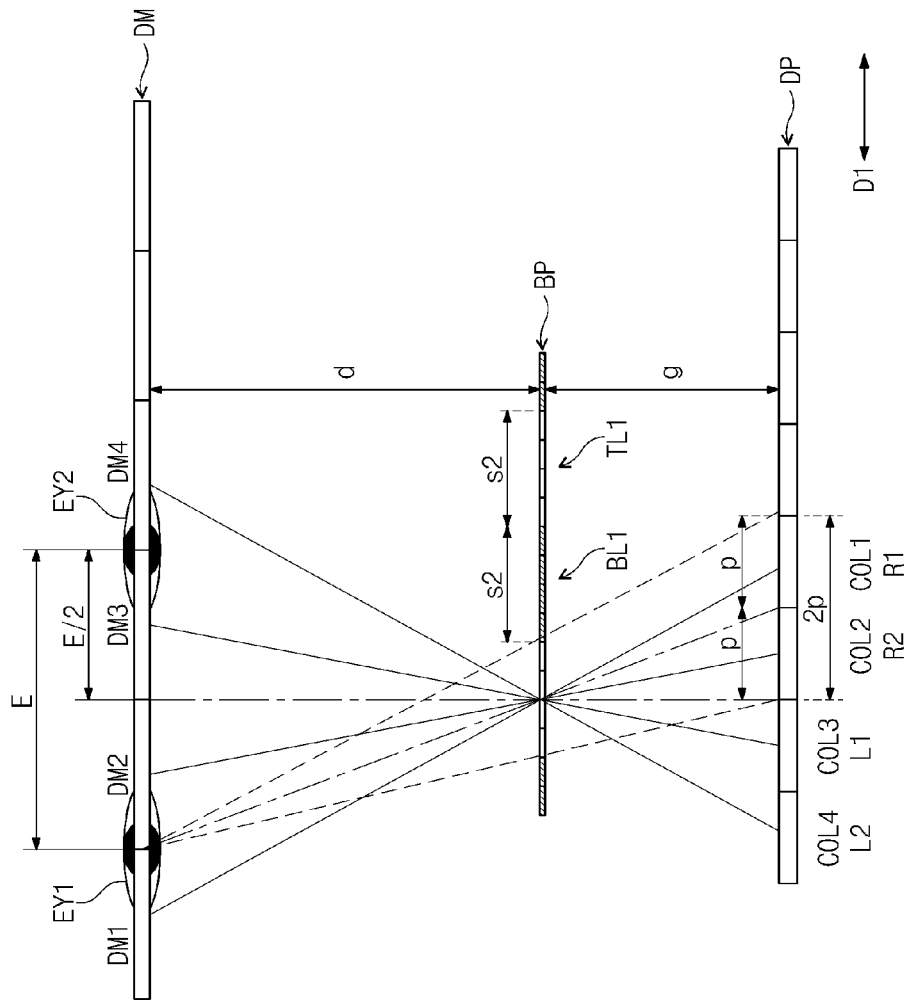
FIG. 6 is a cross-sectional view showing the display panel, the barrier panel, and left and right eyes of the viewer when the barrier panel is operated in the first mode.
Figure 7:
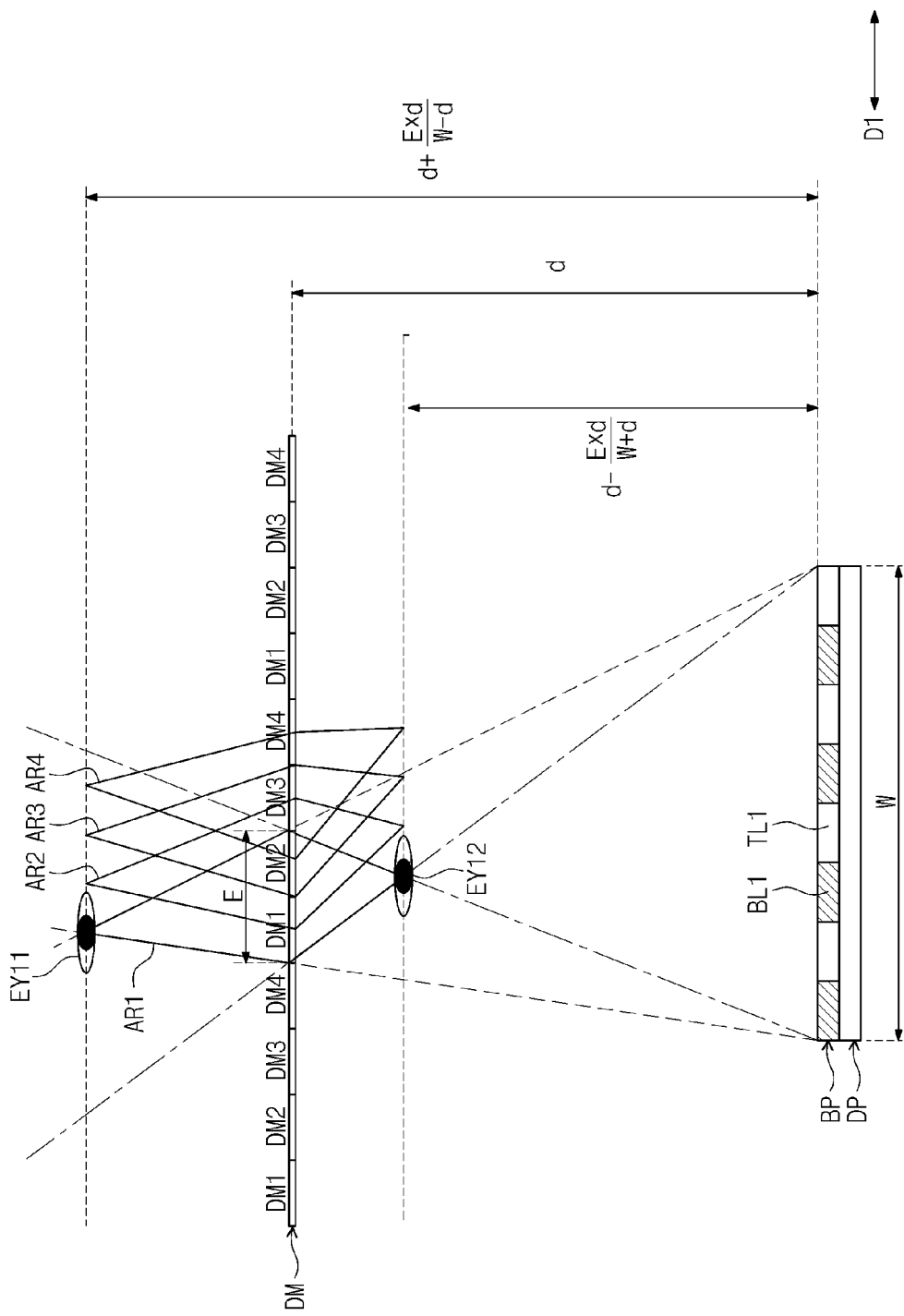
FIG. 7 is a view explaining the operation range when the barrier panel is operated in the first mode.

FIGS. 5 to 7 are views explaining the barrier panel BP operated in the first mode.

FIG. 5 is a plan view showing a portion of the display panel when the barrier panel is operated in the first mode.

Referring to FIG. 5, the display panel DP includes first, second, third, and fourth pixel columns COL1, COL2, COL3, and COL4, which are repeatedly arranged in a unit of four columns adjacent to each other. Each of the first to fourth pixel columns COL1 to COL4 includes a plurality of pixels arranged in the second direction D2.

The display panel DP displays the left-eye image or the right-eye image in each of the first to fourth pixel columns COL1 to COL4. The display panel DP alternately displays the left-eye image and the right-eye image at every two pixel columns of the first to fourth pixel columns COL1 to COL4. The left-eye image includes the first left-eye image L1 and the second left-eye image L2, and the right-eye image includes the first right-eye image R1 and the second right-eye image R2. As shown in FIG. 5, the first pixel column COL1 displays the first right-eye image R1, the second pixel column COL2 displays the second right-eye image R2, the third pixel column COL3 displays the first left-eye image L1, and the fourth pixel column COL4 displays the second left-eye image L2.

FIG. 6 is a cross-sectional view showing the display panel DP, the barrier panel BP, and right and left eyes EY1 and EY2 of the viewer when the barrier panel BP is operated in the first mode.

The barrier panel BP includes the first light transmitting portion TL1 and the first light blocking portion BL1. The first light transmitting portion TL1 and the first light blocking portion BL1 are alternately arranged in the first direction D1. A width 2p1 of two pixel columns in the first direction D1 is recognized through the first light transmitting portion TL1 having the second width s2 in the first direction D1 at any one point on the appropriate visible distance d.

In FIG. 6, when the right eye EY1 is positioned at a position spaced apart from the display panel DP by the appropriate visible distance d, shown as a dotted-line, a width p of the first pixel column COL1 in the first direction D1 and a width p of the second pixel column COL2 in the first direction D1 are recognized at the center of the right eye EY1 through the first light transmitting portion TL1.

The distance E between the right eye EY1 and the left eye EY2 may be a predetermined value. For instance, the distance E between the right eye EY1 and the left eye EY2 may be set to a range from about 5.5 mm to about 7.5 mm in consideration of a distance between both eyes of the person, but it should not be limited thereto. That is, the distance E between the right eye EY1 and the left eye EY2 may be set by detecting the positions of the right eye EY1 and the left eye EY2 using the position detector DTC and measuring the distance between the right eye EY1 and the left eye EY2.

Hereinafter, a method of calculating the second width s2 will be described.

First, the relationship expressed by the following Equation 5 is established between half (E/2) of the distance E between the right eye EY1 and the left eye EY2 located at the appropriate visible distance d, the width p of one pixel column, and a distance g between the barrier panel BP and the display panel DP. Equation 5 is obtained by using properties of two similar triangles, each of which having alternate long and short dash lines shown in FIG. 6 as both sides thereof.

$$d = \frac{E \times g}{2p} \quad \text{Equation 5}$$

Then, the relation of the following Equation 6 is established between the appropriate visible distance d, the second width s2, the distance g between the barrier panel BP and the display panel DP, and the width p of one pixel column. Equation 6 is obtained by using properties of two similar triangles, each of which having dotted lines shown in FIG. 6 as both sides thereof.

$$s2 = \frac{2p \times d}{d + g} \quad \text{Equation 6}$$

Next, the following Equation 7 is obtained by using Equation 5 and Equation 6. The second width s2 is calculated by the following Equation 7.

$$s2 = \frac{2E \times p}{E + 2p} \quad \text{Equation 7}$$

In this case, because the first light blocking portion BL1 has the same width as the first light transmitting portion TL1 in the first direction D1, the first light blocking portion BL1 has the second width s2.

In the case where the viewer is located at the appropriate visible distance d, the image perceived by the viewer is referred to as an appropriate visible image DM. Referring to solid lines in FIG. 6, the appropriate visible image DM includes first, second, third, and fourth appropriate visible images DM1, DM2, DM3, and DM4 respectively displayed in the first, second, third, and fourth pixel columns COL1, COL2, COL3, and COL4. The appropriate visible image DM is repeated in a unit of four appropriate visible images, e.g., first to fourth appropriate visible images DM1 to DM4.

When the right and left eyes EY1 and EY2 of the viewer are spaced apart from the display panel DP by the appropriate visible distance d, and the right and left eyes EY1 and EY2 are located at a boundary between the appropriate visible images of two pixel columns adjacent to each other, the viewer may recognize an optimum 3D image. In FIG. 6, the first right-eye image R1 is displayed in the first pixel column COL1, the second right-eye image R2 is displayed in the second pixel column COL2, and the right eye EY1 is positioned at the boundary between the first appropriate visible image DM1 and the second appropriate visible image DM2. In addition, the first left-eye image L1 is displayed in the third pixel column COL3, the second left-eye image L2 is displayed in the fourth pixel column COL4, and the left eye EY2 is positioned at the boundary between the third appropriate visible image DM3 and the fourth appropriate visible image DM4. Accordingly, the viewer recognizes the first and second right-eye images R1 and R2 through the right eye EY1 and the first and second left-eye images L1 and L2 through the left eye EY2 without recognizing any crosstalk of images.

FIG. 7 is a view explaining the operation range when the barrier panel is operated in the first mode. Hereinafter, the derivation of Equation 1 will be described in detail with reference to FIG. 7.

When the barrier panel BP is operated in the first mode, Equation 1 may be set to allow only the appropriate visible images displayed in two pixel columns adjacent to each other to be perceived by the right eye EY1, or only the appropriate visible images displayed in two pixel columns adjacent to each other to be perceived by the left eye EY2.

FIG. 7 shows only the right eye EY1 of the viewer, and thus hereinafter the derivation of Equation 1 will be described with reference to the right eye EY1. Thus, when the viewer is located at the appropriate visible distance d, the first appropriate visible image DM1 is the first right-eye image R1 perceived by the viewer, the second appropriate visible image DM2 is the second right-eye image R2 perceived by the viewer, the third appropriate visible image DM3 is the first left-eye image L1 perceived by the viewer, and the fourth appropriate visible image DM4 is the second left-eye image L2 perceived by the viewer.

When the distance between the viewer and the barrier panel BP is greater than the appropriate visible distance d, a maximum value of the distance between the viewer and the barrier panel BP is determined such that the viewer recognizes the first and second appropriate visible images DM1 and DM2 through the right eye EY11. Referring to the dotted line shown in FIG. 7, in the case where the distance between the viewer and the barrier panel BP is $$d + \frac{E \times d}{W - d},$$

only the first and second appropriate visible images DM1 and DM2 are recognized by the right eye EY11. When the distance between the viewer and the barrier panel BP becomes greater than $$d + \frac{E \times d}{W - d},$$

the third and fourth appropriate visible images DM3 and DM4 begin to be partially recognized by the right eye EY11.

In addition, when the distance between the viewer and the barrier panel BP is less than the appropriate visible distance d, a minimum value of the distance between the viewer and the barrier panel BP is determined to allow the viewer to recognize the first and second appropriate visible images DM1 and DM2 through the right eye EY12. Referring to the alternate long and short dash line shown in FIG. 7, in the case where the distance between the viewer and the barrier panel BP is $$d - \frac{E \times d}{W + d},$$

only the first and second appropriate visible images DM1 and DM2 are recognized by the right eye EY12. When the distance between the viewer and the barrier panel BP becomes less than $$d - \frac{E \times d}{W + d},$$

the third and fourth appropriate visible images DM3 and DM4 begin to be partially recognized by the right eye EY12.

Consequently, when the viewer is located in a first area AR1, the barrier panel BP is operated in the first mode.

As described with reference to FIG. 3, each of the first light transmitting portion TL1 and the first light blocking portion BL1 has the second width s2 and moves in the first direction D1 by s2/4, and thus the first, second, third, and fourth appropriate visible images DM1, DM2, DM3, and DM4 may move in the first direction D1 by E/4. The first area AR1 may be defined as a second area AR2 when the first to fourth appropriate visible images DM1 to DM4 move in the first direction D1 by E/4, defined as a third area AR3 when the first to fourth appropriate visible images DM1 to DM4 move in the first direction D1 by E/2, and defined as a fourth area AR4 when the first to fourth appropriate visible images DM1 to DM4 move in the first direction D1 by 3E/4. Accordingly, when the viewer is located in the first to fourth areas AR1 to AR4, the barrier panel BP may be operated in the first mode.

FIGS. 8 to 12 are views explaining the barrier panel BP operated in the second mode. Hereinafter, a difference between the barrier panel BP operated in the second mode and the barrier panel BP operated in the first mode will be mainly described while omitting similar details between the two.

Figure 8:
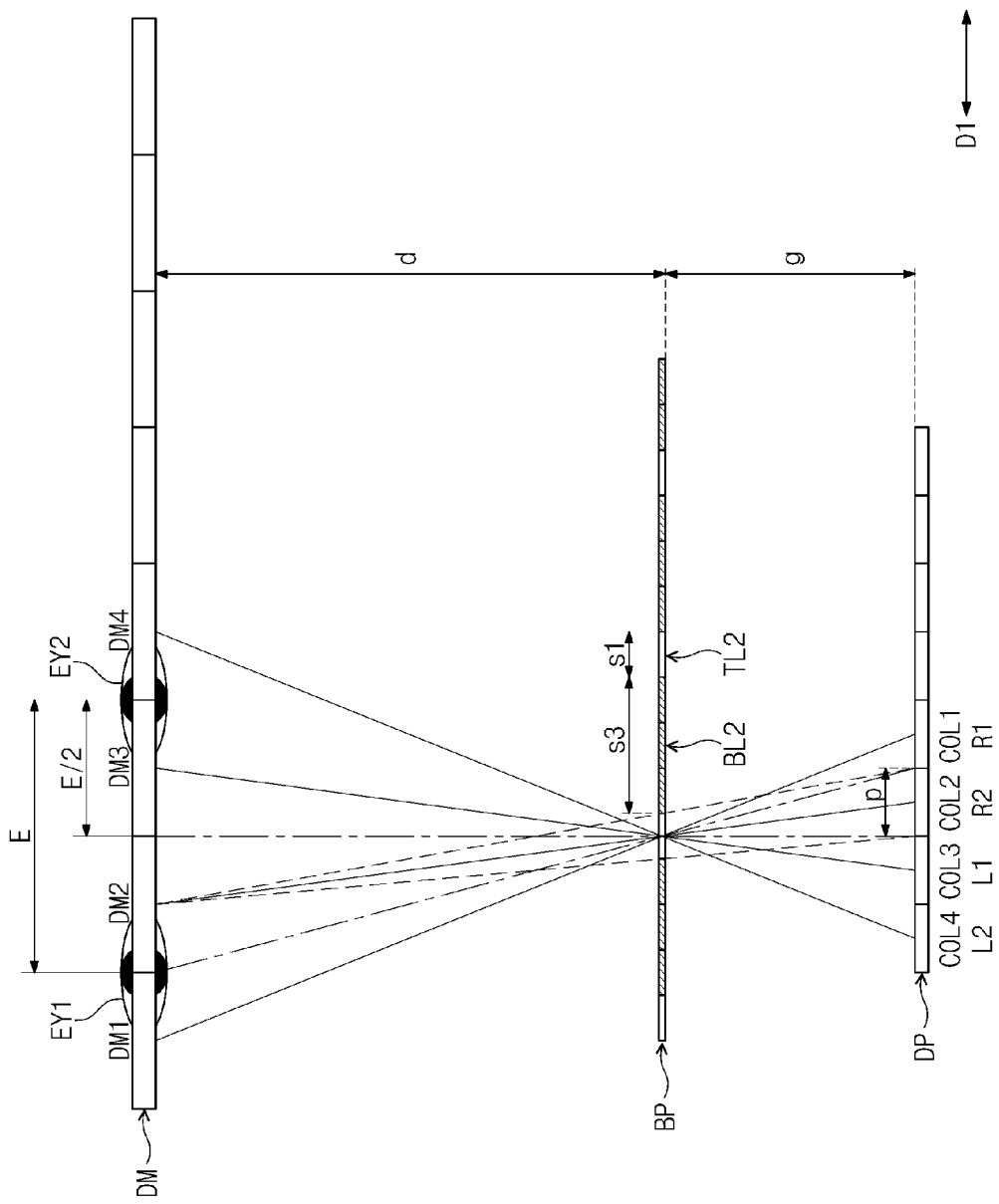
FIG. 8 is a cross-sectional view showing the display panel, the barrier panel, and left and right eyes of the viewer when the barrier panel is operated in the second mode.

FIG. 8 is a cross-sectional view showing the display panel DP, the barrier panel BP, and right and left eyes EY1 and EY2 of the viewer when the barrier panel BP is operated in the second mode.

The barrier panel BP includes the second light transmitting portion TL2 and the second light blocking portion BL2. The second light transmitting portion TL2 and the second light blocking portion BL2 are alternately arranged in the first direction D1. A width p of one pixel column in the first direction D1 is recognized through the second light transmitting portion TL2 having the first width s1 in the first direction D1 at any one point on the appropriate visible distance d.

In FIG. 8, when the right eye EY1 is positioned at a position spaced apart from the display panel DP by the appropriate visible distance d, as shown in the dotted-line, the width p of the second pixel column COL2 in the first direction D1 is recognized at any one point on the appropriate visible distance d through the second light transmitting portion TL2.

The distance E between the right eye EY1 and the left eye EY2 is the same as that when the barrier panel BP is operated in the first mode, and thus a detailed description of the distance E will be omitted.

Hereinafter, a method of calculating the first width s1 will be described.

First, the relationship expressed by the following Equation 8 is established between half (E/2) of the distance E between the right eye EY1 and the left eye EY2 located at the appropriate visible distance d, the width p of one pixel column, and the distance g between the barrier panel BP and the display panel DP. Equation 8 is obtained by using properties of two similar triangles each of which is defined by alternate long and short dash lines shown in FIG. 8.

$$d = \frac{E \times g}{2p} \qquad \text{Equation 8}$$

Then, the relation of the following Equation 9 is established between the appropriate visible distance d, the first width s1, the distance g between the barrier panel BP and the display panel DP, and the width p of one pixel column. Equation 9 is obtained by using properties of two similar triangles each of which is defined by dotted lines shown in FIG. 8.

$$s1 = \frac{p \times d}{d + g} \qquad \text{Equation 9}$$

Next, the following Equation 10 is obtained by using Equation 8 and Equation 9. The first width s1 is derived by the following Equation 10.

$$s1 = \frac{E \times p}{E + 2p} \qquad \text{Equation 7}$$

In this case, the second light blocking portion BL2 has the width s3 three times greater than the first width s1 in the first direction D1.

Figure 9:
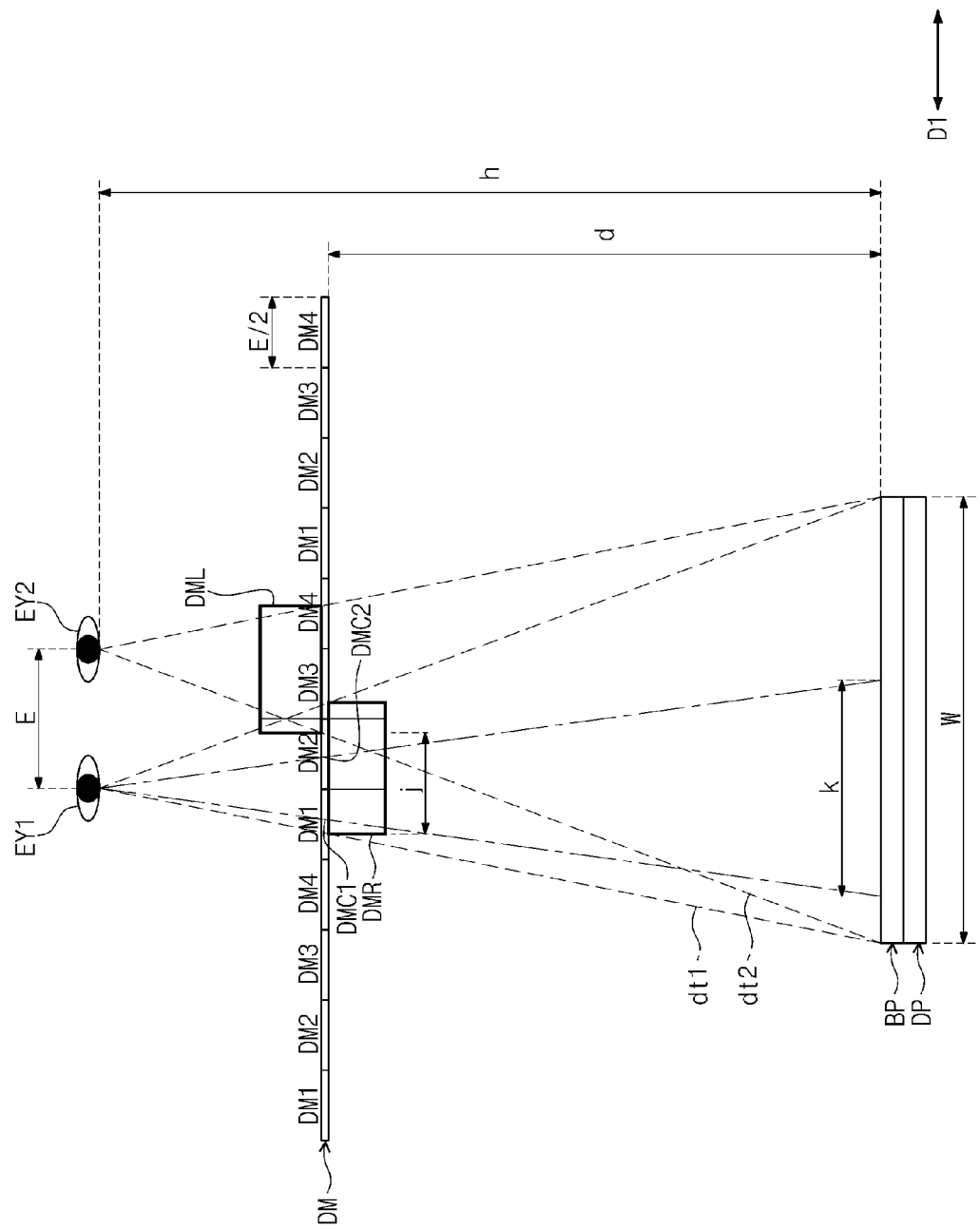
FIG. 9 is a view explaining an operation of the display panel when the barrier panel is operated in the second mode.

FIG. 9 is a view explaining an operation of the display panel DP when the barrier panel BP is operated in the second mode. In this case, the operation of the display panel DP will be described assuming that the distance between the viewer and the barrier panel BP is greater than the appropriate visible distance d.

In FIG. 9, among the appropriate visible images DM, a right-eye appropriate visible image DMR, in which the image displayed in all the pixels is recognized by the right eye EY1, and a left-eye appropriate visible image DML, in which the image displayed in all the pixels is recognized by the left eye EY2, are defined. FIG. 9 shows the right-eye appropriate visible image DMR that includes one second appropriate visible image DM2, a portion of one first appropriate visible image DM1, and a portion of one third appropriate visible image DM3, and the left-eye appropriate visible image DML that includes one third appropriate visible image DM3, a portion of one second appropriate visible image DM2, and a portion of one fourth appropriate visible image DM4.

The display panel DP is divided in a unit of a control width k, which satisfies the following Equation 11, to correspond to the right eye EY1 or the left eye EY2. Equation 11 is obtained by using properties of two similar triangles that share an alternate long and short dash line shown in FIG. 8.

$$k = \frac{h \times E}{2(h - d)} \qquad \text{Equation 11}$$

Hereinafter, a boundary between two control widths k adjacent to each other will be described in detail with reference to FIG. 9. Here, the boundary between two control widths k will be described in association with the right eye EY1, but it is not limited thereto. That is, descriptions of the boundary between two control widths k with reference to the left eye EY2 may be the same as that of the boundary between two control widths k with reference to the right eye EY1.

Referring to the alternate long and short dash line shown in FIG. 9, a first center line DMC1 crossing a center portion of the width in the first direction D1 of the first appropriate visible image DM1 and a second center line DMC2 crossing a center portion of the width in the first direction D1 of the second appropriate visible image DM2 are defined. The first and second center lines DMC1 and DMC2 are substantially normal to the first direction D1 when viewed in a plan view.

The boundary between the two adjacent control widths k may be determined by projecting the first and second center lines DMC1 and DMC2 onto the display panel DP from the right eye EY1.

Figure 10:
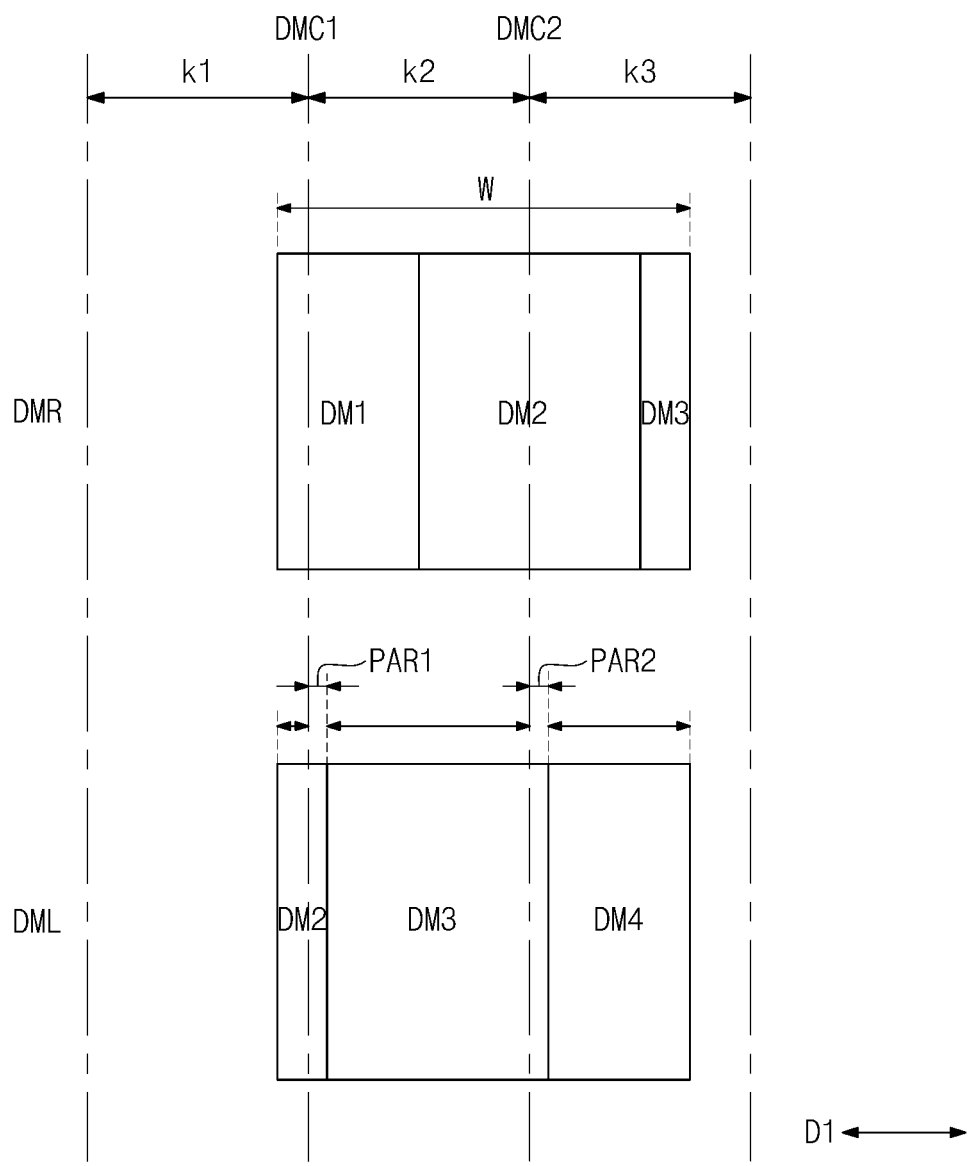
FIG. 10 is a view showing a left appropriate visible image and a right appropriate visible image of FIG. 9, which are projected on an upper surface of the display panel.

Hereinafter, a method of controlling the display order of the left-eye image and the right-eye image on the display panel DP will be described with reference to FIG. 10. FIG. 10 is a view showing the right-eye appropriate visible image DMR and the left-eye appropriate visible image DML of FIG. 9, which are projected onto an upper surface of the display panel DP.

Referring to FIGS. 8 to 10, the display panel DP may control the display order of the left-eye image and the right-eye image at every control width k. The display panel DP alternately displays the left-eye image and the right-eye image in a unit of two pixel columns in each control width k.

A width W in the first direction D1 of all pixel columns in the display panel DP is divided in a unit of the control width k. FIG. 10 shows the width W of the pixel columns, which is divided into a first control width k1, a second control width k2, and a third control width k3, as a representative example.

The right-eye appropriate visible image DMR includes the portion of the first appropriate visible image DM1 in an area corresponding to the first control width k1, half of the second appropriate visible image DM2 in an area corresponding to the second control width k2, and the portion of the third appropriate visible image DM3 in an area corresponding to the third control width k3. In other words, the right eye EY1 recognizes only the image displayed in the first pixel column COL1 among the first to fourth pixel columns COL1 to COL4 in the first control width k1, only the image displayed in the first and second pixel columns COL1 and COL2 among the first to fourth pixel columns COL1 to COL4 in the second control width k2, and only the image displayed in the third pixel column COL3 among the first to fourth pixel columns COL1 to COL4 in the third control width k3.

In every control width k, the display panel DP shifts the first right-eye image R1, the second right-eye image R2, the first left-eye image L1, and the second left-eye image L2 by one pixel column along the first direction D1 and displays them.

In detail, in the first control width k1, the display panel DP displays the first right-eye image R1, the second right-eye image R2, the first left-eye image L1, and the second left-eye image L2 in the fourth pixel column COL4, the first pixel column COL1, the second pixel column COL2, and the third pixel column COL3, respectively. In addition, the display panel DP displays the first right-eye image R1, the second right-eye image R2, the first left-eye image L1, and the second left-eye image L2 in the first pixel column COL1, the second pixel column COL2, the third pixel column COL3, and the fourth pixel column COL4, respectively, in the second control width k2. Further, the display panel DP displays the first right-eye image R1, the second right-eye image R2, the first left-eye image L1, and the second left-eye image L2 in the second pixel column COL2, the third pixel column COL3, the fourth pixel column COL4, and the first pixel column COL1, respectively, in the third control width k3.

The display panel DP controls the pixel columns, in which the left-eye image and the right-eye image are displayed, in each control width with reference to the right eye EY1, and therefore the right eye EY1 always recognizes only the right-eye image.

The display panel DP displays the first left-eye image L1 through the second pixel column COL2 in the first control width k1. Since the left eye EY2 recognizes the image displayed through the second pixel column COL2 in the area corresponding to the first control width k1, the left eye EY2 recognizes the left-eye image.

The display panel DP displays the second right-eye image R2 through the second pixel column COL2 and the first left-eye image L1 through the third pixel column COL3 in the second control width k2. In the area corresponding to the second control width k2, the left eye EY2 recognizes the right-eye image in a first plane area PAR1 in which the image displayed in the second pixel column COL2 is recognized and recognizes the left-eye image in the area in which the image displayed in the third pixel column COL3 is recognized. That is, the right eye EY1 and the left eye EY2 recognize the right-eye image in the first plane area PAR1, and thus the viewer recognizes the 2D image in the first plane area PAR1.

The display panel DP displays the second right-eye image R2 through the third pixel column COL3 and the first left-eye image L1 through the fourth pixel column COL4 in the third control width k3. In the area corresponding to the third control width k3, the left eye EY2 recognizes the right-eye image in a second plane area PAR2 in which the image displayed in the third pixel column COL3 is recognized and recognizes the left-eye image in the area in which the image displayed in the fourth pixel column COL4 is recognized. That is, the right eye EY1 and the left eye EY2 recognize the right-eye image in the second plane area PAR2, and therefore the viewer recognizes the 2D image in the second plane area PAR2.

As described above, because the display panel DP controls the pixel columns, through which the left-eye image and the right-eye image are displayed, in each control width k with reference to the right eye EY1 or the left eye EY2, the area in which the 2D image is recognized occurs in accordance with the distance between the viewer and the barrier panel BP. However, in the case where the distance between the viewer and the barrier panel BP satisfies Equations 2 and 3, the 2D image occurs only in the range convenient for the viewer to recognize the 3D image.

In FIGS. 9 and 10, the distance between the viewer and the barrier panel BP is greater than the appropriate visible distance d, but although the distance between the viewer and the barrier panel BP is less than the appropriate visible distance d, the operation of the display panel DP is the same as that of the display panel DP when the distance between the viewer and the barrier panel BP is greater than the appropriate visible distance d.

FIGS. 11A to 11D are plan views showing a portion of the display panel DP when the barrier panel BP is operated in the second mode.

The display panel DP may control the images displayed in the first to fourth pixel columns COL1 to COL4 to be displayed in one of the display orders shown in FIGS. 11A to 11D.

Hereinafter, the procedure of drawing Equation 2 and Equation 3 will be described in detail.

First, the distance h between the viewer and the barrier panel BP should be greater than $$d - \frac{E \times d}{W + d}$$

and less than $$d + \frac{E \times d}{W - d}.$$

In other words, the distance h between the viewer and the barrier panel BP should be out of the range defined by Equation 1.

This means that the barrier panel BP is operated in the second mode instead of the first mode. Referring to FIGS. 6 and 8, because the second width s2 is two times greater than the first width s1, the image perceived by the viewer has high resolution and brightness when the barrier panel BP is operated in the first mode in comparison with the image perceived by the viewer when the barrier panel BP is operated in the second mode. In this case, however, more crosstalk occurs when the barrier panel BP is operated in the first mode than when the barrier panel BP is operated in the second mode. The crosstalk occurring when the barrier panel BP is operated in the first mode may be prevented by precisely detecting the position of the viewer using the position detector DTC (refer to FIGS. 1 and 2) and controlling the positions of the light transmitting portion and the light blocking portion. Thus, basically the barrier panel BP is operated in the first mode, but is operated in the second mode when the distance h between the viewer and the barrier panel BP is out of the range defined by Equation 1.

Hereinafter, the procedure of defining an upper limit of Equation 3 will be described in detail with reference to FIG. 12.

In the case where the barrier panel BP is operated in the second mode, the upper limit of Equation 3 may be set to allow the right eye to recognize half of the left-eye image or less on the assumption that the right eye recognizes only the right-eye image and the left eye recognizes only the left-eye image or half of the right-eye image or less.

As described with reference to FIG. 10, because the display panel DP controls the pixel columns through which the left-eye image and the right-eye image are displayed, in each control width k, a rate of the right-eye image is limited to be equal to or less than about 50% with respect to a left estimation image EML when assuming that a right estimation image EMR is configured to include only the right-eye image.

Figure 12:
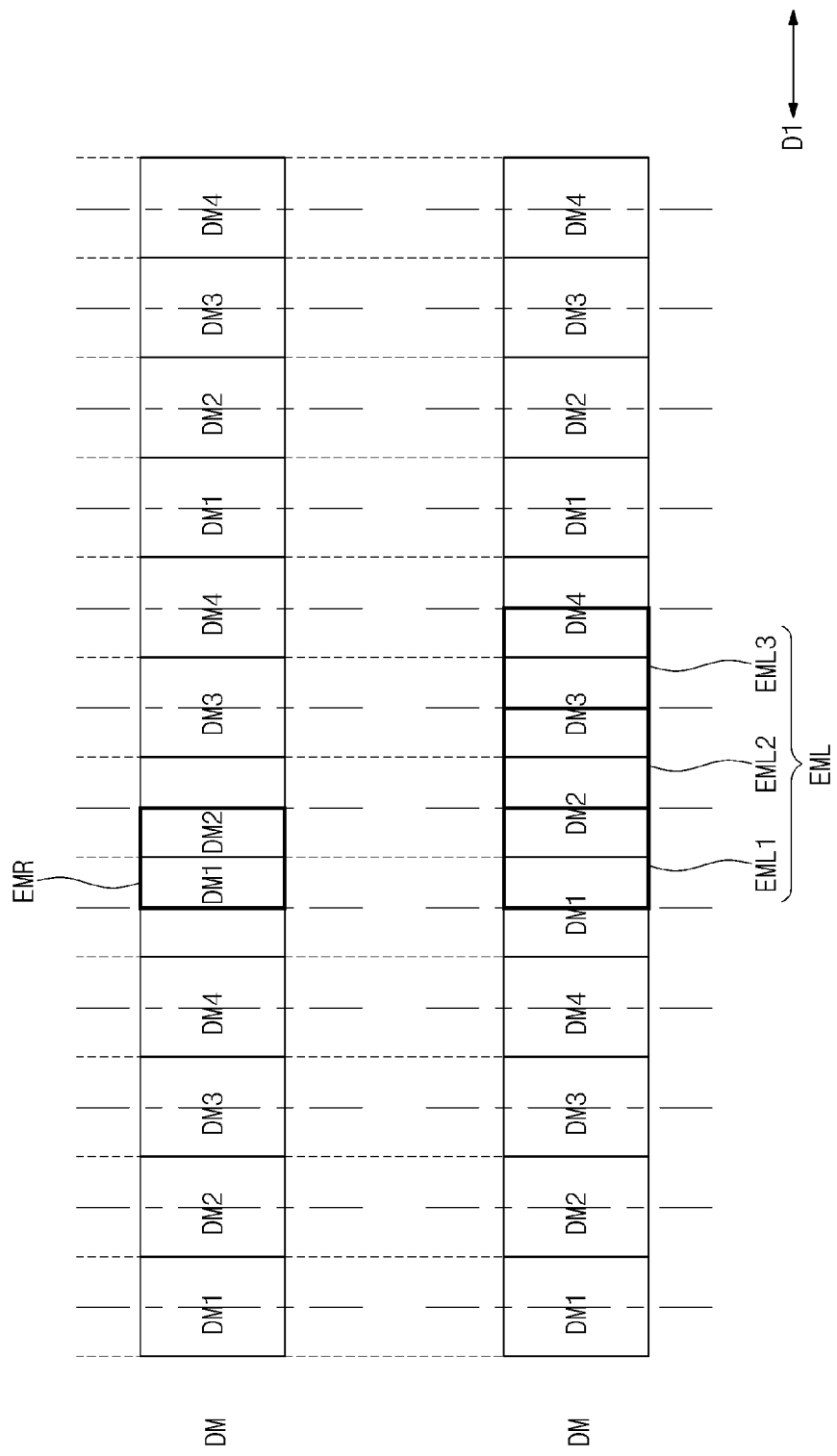
FIG. 12 is a view showing an appropriate visible image when a distance between the viewer and the barrier panel is greater than an appropriate visible distance.

FIG. 12 is a view showing the appropriate visible image DM when the distance between the viewer and the barrier panel BP is greater than the appropriate visible distance.

Referring to FIG. 12, the right-eye estimation image EMR and the left-eye estimation image EML are defined. The right-eye estimation image EMR is the appropriate visible image corresponding to one control width k among the right-eye appropriate visible images DMR shown in FIG. 9. The left-eye estimation image EML is the left-eye appropriate visible image corresponding to the same control width k as the right-eye estimation image EMR among the left-eye appropriate visible images DML shown in FIG. 9. For instance, the right-eye estimation image EMR is the appropriate visible image corresponding to the second control width k2 in the right-eye appropriate visible image DMR, and the left-eye estimation image EML is the appropriate visible image corresponding to the second control width k2 in the left-eye appropriate visible image DML. The left-eye estimation image EML is divided into a first left-eye estimation image EML1, a second left-eye estimation image EML2, and a third left-eye estimation image EML3 according to the rate of the right-eye image.

Each of the right-eye estimation image EMR and the left-eye estimation image EML has a width of about E/2 in the first direction D1.

The right-eye estimation image EMR is set to include half of each of the first appropriate visible image DM1 and the second appropriate visible image DM2. In addition, the display panel DP controls the width in the first direction D1 of the right-eye estimation image EMR within the control width k projected onto the display panel DP so as to allow the first right-eye image R1 to be displayed in the first pixel column COL1, the second right-eye image R2 to be displayed in the second pixel column COL2, the first left-eye image L1 to be displayed in the third pixel column COL3, and the second left-eye image L2 to be displayed in the fourth pixel column COL4. Accordingly, the right eye recognizes only the right-eye image, in which the right-eye estimation image EMR is recognized.

The first left-eye estimation image EML1 includes half of each of the first appropriate visible image DM1 and the second appropriate visible image DM2. Thus, the left eye, at which the first left-eye estimation image EML1 is recognized, recognizes only the right-eye image. In this case, the viewer perceives a complete 2D image, and the distance between the viewer and the barrier panel BP is infinite.

The third left-eye estimation image EML3 includes half of each of the third appropriate visible image DM3 and the fourth appropriate visible image DM4. Thus, the left eye, at which the third left-eye estimation image EML3 is recognized, recognizes only the left-eye image. In this case, the viewer perceives a complete 3D image and the distance between the viewer and the barrier panel BP is the appropriate visible distance d.

The second left-eye estimation image EML2 includes half of each of the second appropriate visible image DM2 and the third appropriate visible image DM3. Thus, the left eye, at which the second left-eye estimation image EML2 is recognized, recognizes half of the right-eye image and half of left-eye image. In this case, the viewer perceives a complete 2D image and the distance between the viewer and the barrier panel BP is infinite. Because at least the 3D image perceived by the viewer should be equal to or more than 50%, the distance between the viewer and the barrier panel BP, which is determined by the second left-eye estimation image EML2, may be the upper limit of Equation 2.

In the first direction D1, a position difference of E/2 occurs between the right-eye estimation image EMR and the second left-eye estimation image EML2, and the upper limit of Equation 2 is determined to be 2d by the following Equation 12. Equation 12 is obtained by using properties of two similar triangles that share two dotted lines dt1 and de2 shown in FIG. 9.

$$j = \frac{d \times E}{h} \qquad \text{Equation 12}$$

In Equation 12, j denotes the position difference between the right-eye appropriate visible image and the left-eye appropriate visible image in the first direction D1.

Referring to back FIGS. 6 and 8, when the barrier panel BP is operated in the second mode, the brightness of the image displayed in the display panel DP may be two times greater than the brightness of the image displayed in the display panel DP when the barrier panel BP is operated in the first mode.

Therefore, although the difference in width between the first light transmitting portion TL1 and the second light transmitting portion TL2 exists in the first direction D1, the viewer may perceive the same brightness when the barrier panel BP is operated in the first mode or the second mode.

In detail, in the case where the barrier panel BP is operated in the second mode, the brightness of the light from the backlight unit (not shown) may be two times greater than the brightness of the light from the backlight unit (not shown) when the barrier panel BP is operate in the first mode.

FIGS. 13 to 17 are views explaining the barrier panel BP operated in the third mode. Hereinafter, a difference between the barrier panel BP operated in the third mode and the barrier panel BP operated in the second mode will be mainly described and details of the others will be omitted.

Figure 13:
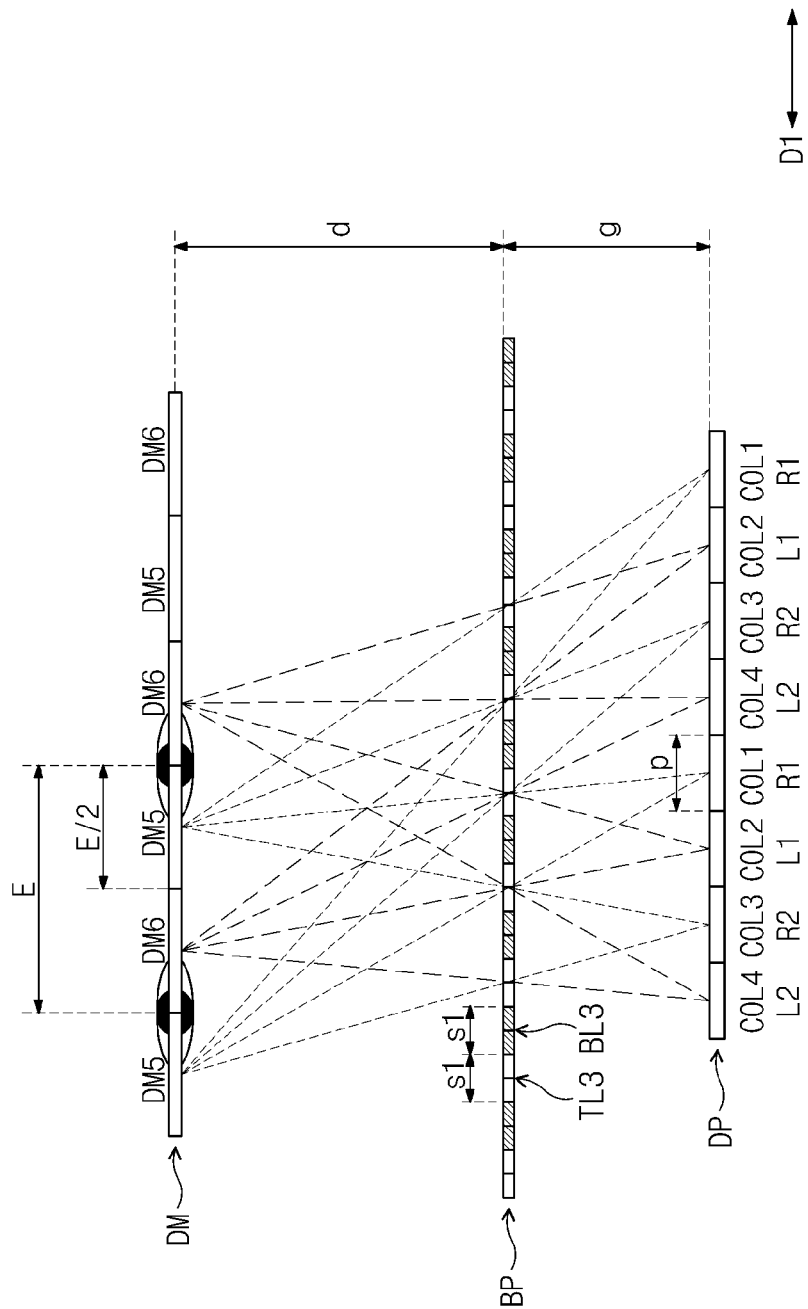
FIG. 13 is a cross-sectional view showing the display panel, the barrier panel, and the left and right eyes when the barrier panel is operated in the third mode.

FIG. 13 is a cross-sectional view showing the display panel DP, the barrier panel BP, and the right and left eyes EY1 and EY2 when the barrier panel BP is operated in the third mode.

Referring to FIG. 13, the display panel DP displays the left-eye image or the right-eye image in each of the first to fourth pixel columns COL1 to COL4. The display panel DP alternately displays the left-eye image and the right-eye image in every one pixel column within one control width. The control width will be described later.

In FIG. 13, the first right-eye image R1 is displayed through the first pixel column COL1, the first left-eye image L1 is displayed through the second pixel column COL2, the second right-eye image R2 is displayed through the third pixel column COL3, and the second left-eye image L2 is displayed through the fourth pixel column COL4.

The barrier panel BP includes the third light transmitting portion TL3 and the third light blocking portion BL3. The third light transmitting portion TL3 and the third light blocking portion BL3 are alternately arranged with each other in the first direction D1. A width p in the first direction D1 of one pixel column is recognized through the third light transmitting portion TL3 having the first width s1 in the first direction D1 at any one point on the appropriate visible distance d.

The first width s1 may be obtained by using Equations 8 to 10, and thus details thereof will be omitted.

The third light blocking portion BL3 has the same width as that of the third light transmitting portion TL3 in the first direction D1. That is, the third light blocking portion BL3 has the first width s1.

When the viewer is located at the appropriate visible distance d, the image perceived by the viewer is the appropriate visible image DM. Referring to dotted-lines shown in FIG. 13, the appropriate visible image DM includes a fifth appropriate visible image DM5 corresponding to the images displayed in the first pixel column COL1 and the third pixel column COL3 and a sixth appropriate visible image DM6 corresponding to the images displayed in the second pixel column COL2 and the fourth pixel column COL4. The appropriate visible image DM may be repeated in the unit of two appropriate visible images, e.g., the first and second appropriate visible images DM1 and DM2.

Figure 14:
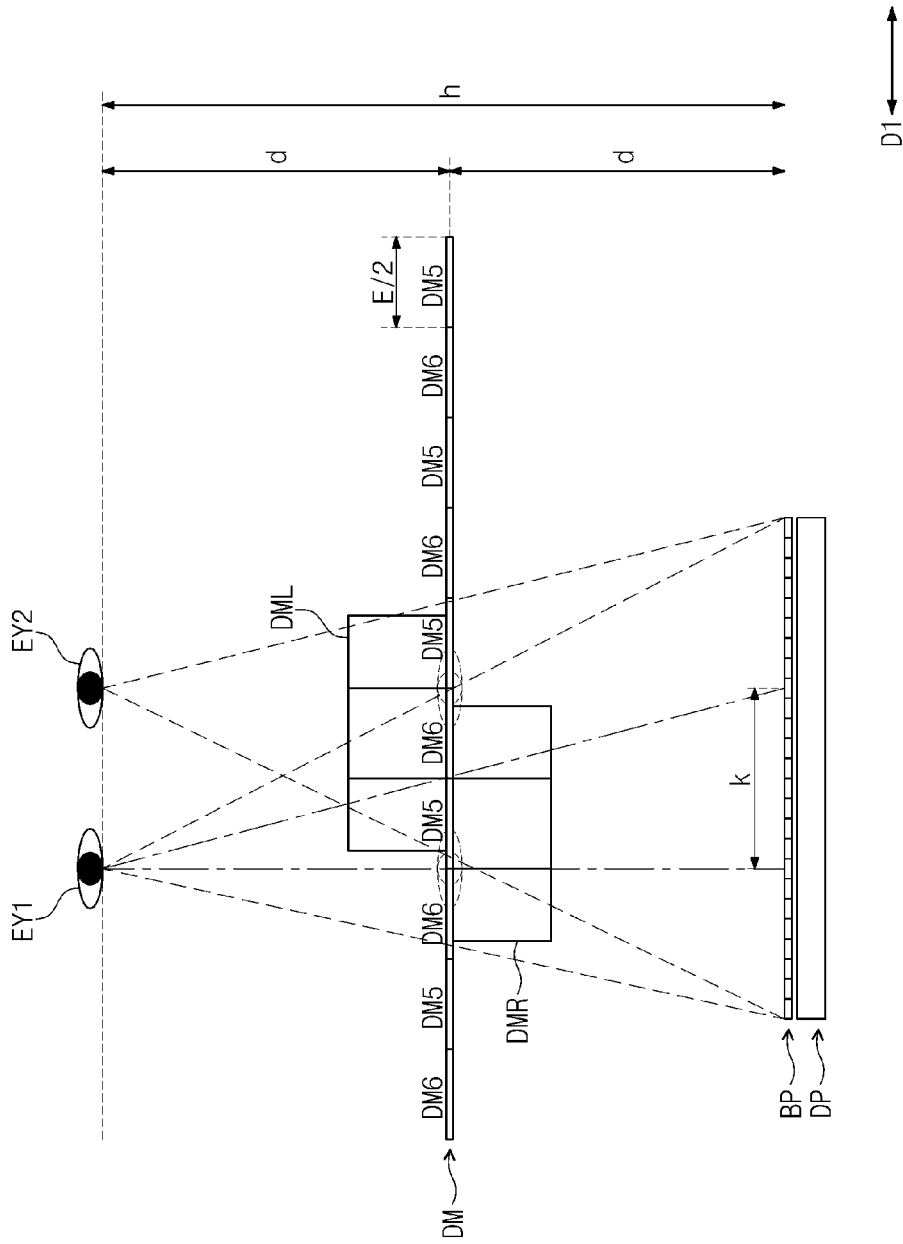
FIG. 14 is a view explaining an operation of the display panel when the barrier panel is operated in the third mode.

FIG. 14 is a view explaining an operation of the display panel DP when the barrier panel BP is operated in the third mode. In FIG. 14, the distance between the viewer and the barrier panel BP is two times greater than the appropriate visible distance d.

In FIG. 14, among the appropriate visible images DM, a right-eye appropriate visible image DMR, in which the image displayed in all the pixels is recognized by the right eye EY1, and a left-eye appropriate visible image DML, in which the image displayed in all the pixels is recognized by the left eye EY2, are defined. The right-eye appropriate visible image DMR includes one fifth appropriate visible image DM5 and a portion of two sixth appropriate visible images DM6, and the left-eye appropriate visible image DML includes one sixth appropriate visible image DM6 and a portion of two fifth appropriate visible images DM5.

The display panel DP may be divided in the unit of control width k determined by Equation 11 in correspondence to the right eye EY1 or the left eye EY2. Equation 11 is obtained by using properties of two similar triangles that share alternate long and short dash lines shown in FIG. 14.

Hereinafter, a boundary between two control widths k adjacent to each other will be described with reference to FIG. 14. Here, the boundary between two control widths k will be described in association with the right eye EY1, but it should not be limited thereto. That is, descriptions of the boundary between two control widths k with reference to the left eye EY2 may be the same as that of the boundary between two control widths k with reference to the right eye EY1.

Referring to the alternate long and short dash lines shown in FIG. 14, the boundary between the two adjacent control widths k may be determined by projecting the width in the first direction D1 of the fifth appropriate visible image DM5 onto the upper surface of the display panel DP from the right eye EY1.

Figure 15:
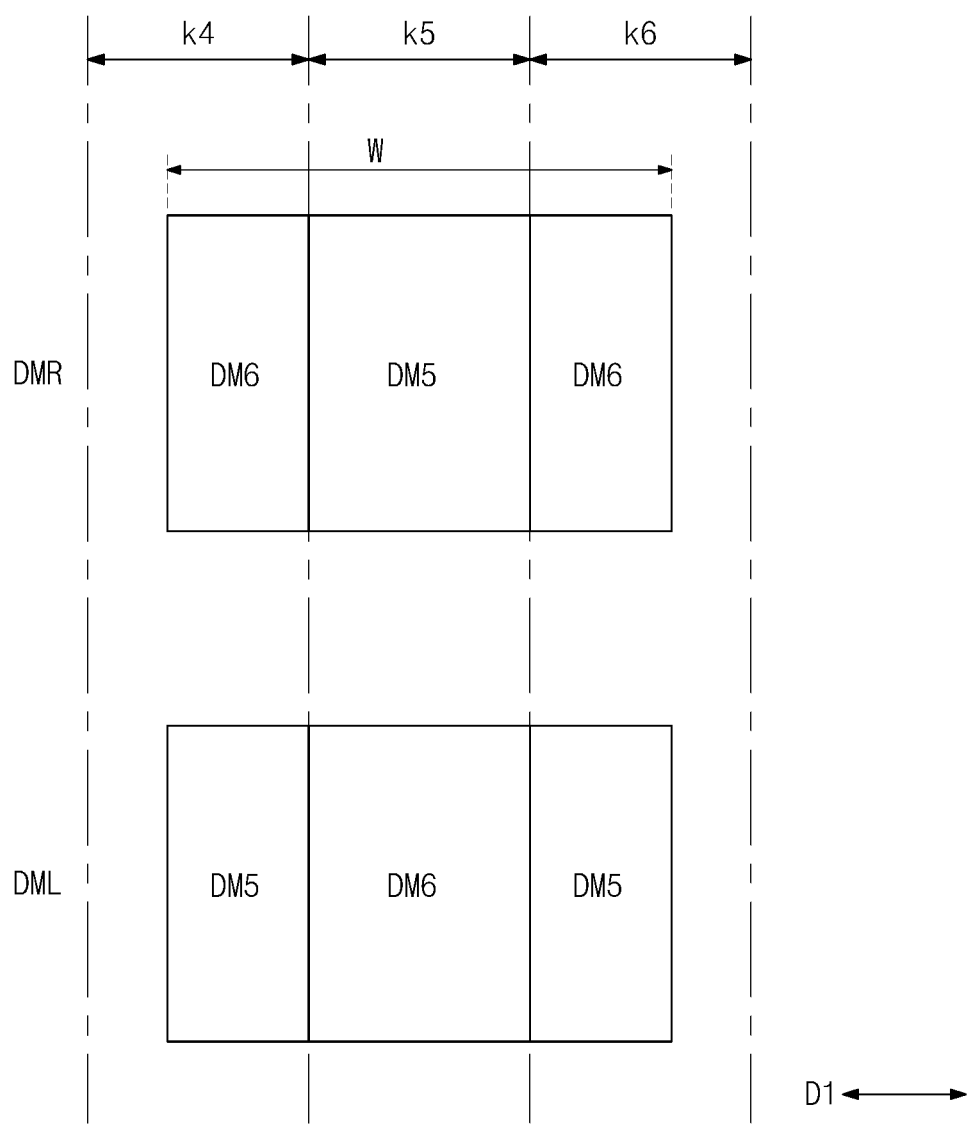
FIG. 15 is a view showing a left appropriate visible image and a right appropriate visible image of FIG. 14, which are projected on an upper surface of the display panel.

Hereinafter, a method of controlling the display order of the left-eye image and the right-eye image on the display panel DP will be described with reference to FIG. 15. FIG. 15 is a view showing the right-eye appropriate visible image DMR and the left-eye appropriate visible image DML of FIG. 14, which are projected on the upper surface of the display panel DP.

Referring to FIGS. 13 to 15, the display panel DP may control the display order of the left-eye image and the right-eye image at every control width k. The display panel DP alternately displays the left-eye image and the right-eye image at every one pixel column in each control width k.

A width W in the first direction D1 of all pixel columns in the display panel DP is divided in the unit of the control width k. FIG. 15 shows the width W of the pixel columns, which is divided into a fourth control width k4, a fifth control width k5, and a sixth control width k6, as a representative example.

The right-eye appropriate visible image DMR includes the portion of one sixth appropriate visible image DM6 in an area corresponding to the fourth control width k4, one fifth appropriate visible image DM5 in an area corresponding to the fifth control width k5, and a portion of one sixth appropriate visible image DM6 in an area corresponding to the sixth control width k6. In other words, the right eye EY1 recognizes only the image displayed in the first and third pixel columns COL1 and COL3 among the first to fourth pixel columns COL1 to COL4 in the fourth control width k4, only the image displayed in the second and fourth pixel columns COL2 and COL4 among the first to fourth pixel columns COL1 to COL4 in the fifth control width k5, and only the image displayed in the first and third pixel columns COL1 and COL3 among the first to fourth pixel columns COL1 to COL4 in the sixth control width k6.

In every control width k, the display panel DP changes the pixel column through which the left-eye image is displayed and the pixel column through which the right-eye image is displayed. In detail, the display panel DP displays the right-eye images in the first and third pixel columns COL1 and COL3 and displays the left-eye images in the second and fourth pixel columns COL2 and COL4 in one control width of the two control widths adjacent to each other. In this case, the display panel DP displays the left-eye images in the first and third pixel columns COL1 and COL3 and displays the right-eye images in the second and fourth pixel columns COL2 and COL4 in the other one control width of the two control widths adjacent to each other.

In more detail, the display panel DP shifts the first right-eye image R1, the second right-eye image R2, the first left-eye image L1, and the second left-eye image L2 by one pixel column along the first direction D1 and displays them.

Referring to FIG. 15, in the fourth control width k4, the display panel DP displays the right-eye image through the second and fourth pixel columns COL2 and COL4 and displays the left-eye images through the first and third pixel columns COL1 and COL3. In addition, the display panel DP displays the right-eye image through the first and third pixel columns COL1 and COL3 and displays the left-eye image through the second and fourth pixel columns COL2 and COL4 in the fifth control width k5. Further, the display panel DP displays the right-eye image through the second and fourth pixel columns COL2 and COL4 and displays the left-eye image through the first and third pixel columns COL1 and COL3 in the third control width k3.

The display panel DP controls the pixel columns, through which the left-eye image and the right-eye image are displayed, in every each control width k with reference to the right eye EY1, and therefore the right eye EY1 always recognizes only the right-eye image.

The display panel DP displays the left-eye image through the first and third pixel columns COL1 and COL3 in the fourth control width k4. Because the left eye EY2 recognizes the image displayed through the first and third pixel columns COL1 and COL3 in the area corresponding to the fourth control width k4, the left eye EY2 recognizes the left-eye image.

The display panel DP displays the left-eye image through the second and fourth pixel columns COL2 and COL4 in the fifth control width k5. In the area corresponding to the fifth control width k5, the left eye EY2 recognizes the image displayed through the second and fourth pixel columns COL2 and COL4, and thus the left eye EY2 recognized the left-eye image.

The display panel DP displays the left-eye image through the first and third pixel columns COL1 and COL3 in the sixth control width k6. In the area corresponding to the sixth control width k6, the left eye EY2 recognizes the image displayed through the first and third pixel columns COL1 and COL3, and thus the left eye EY2 recognizes the left-eye image.

Consequently, in the case where the distance between the barrier panel BP is two times greater than the appropriate visible distance d, the display panel DP may be controlled to allow the right-eye image and the left-eye image to be recognized by the right eye EY1 and the left eye EY2, respectively.

FIGS. 16A to 16D are plan views showing a portion of the display panel DP when the barrier panel BP is operated in the third mode.

The display panel DP may control the images displayed through the first to fourth pixel columns COL1 to COL4 in the control width k to be displayed in one of the display orders shown in FIGS. 16A to 16D.

Hereinafter, the procedure of deriving Equation 4 will be described in detail.

First, the distance h between the viewer and the barrier panel BP is required to be greater than $$d + \frac{E \times d}{W - d}.$$

Equation 4 means that the barrier panel BP is operated in the second mode other than the first mode. Referring to FIGS. 6 and 13, the image perceived by the viewer has the same resolution and brightness when the barrier panel BP is operated in the first mode in comparison with those when the barrier panel BP is operated in the third mode. This is because the area of the first light transmitting portion TL1 is the same as the area of the third light transmitting portion TL3 in the barrier panel BP.

On the other hand, more crosstalk occurs when the barrier panel BP is operated in the third mode than when the barrier panel BP is operated in the first mode. Thus, basically the barrier panel BP is operated in the first mode, but is operated in the third mode when the distance h between the viewer and the barrier panel BP is greater than the upper limit defined by Equation 1.

Then, the distance h between the viewer and the barrier panel BP should be equal to or greater than 2d. As described with reference to FIG. 14, when the distance between the viewer and the barrier panel BP is 2d, the viewer may recognize an optimum 3D image.

Hereinafter, a rate of the left-eye image recognized by the left eye will be described in detail according to the distance h between the viewer and the barrier panel BP while the right eye recognizes the right-eye image.

FIG. 17 is a view showing the appropriate visible image DM when the distance between the viewer and the barrier panel BP is two times greater than the appropriate visible distance.

Referring to FIG. 17, the right-eye estimation image EMR' and the left-eye estimation image EML' are defined. The right-eye estimation image EMR' is the appropriate visible image corresponding to one control width k among the right-eye appropriate visible image DMR shown in FIG. 15. The left-eye estimation image EML' is the left-eye appropriate visible image corresponding to the same control width k as that of the right-eye estimation image EMR' among the left-eye appropriate visible image DML shown in FIG. 15. For instance, the right-eye estimation image EMR' is the appropriate visible image corresponding to the fifth control width k5 in the right-eye appropriate visible image DMR, and the left-eye estimation image EML' is the appropriate visible image corresponding to the fifth control width k5 in the left-eye appropriate visible image DML.

Each of the right-eye estimation image EMR' and the left-eye estimation image EML' has a width of about E/2 in the first direction D1.

The right-eye estimation image EMR' is set to include one fifth appropriate visible image DM5. In addition, the display panel DP controls the width in the first direction D1 of the right-eye estimation image EMR' within the control width k projected onto the display panel DP so as to allow the right-eye image to be displayed in the first and third pixel columns COL1 and COL3 and the left-eye image to be displayed in the second and fourth pixel columns COL2 and COL4. Accordingly, the right eye recognizes only the right-eye image, at which the right-eye estimation image EMR is recognized.

The left-eye estimation image EML' includes half of each of the fifth appropriate visible image DM5 and the sixth appropriate visible image DM6. Thus, the left eye, at which the left-eye estimation image EML' is recognized, recognizes a half of the right-eye image and a half of left-eye image. In this case, the viewer perceives the 3D image of about 50%. In the first direction D1, a position difference of E/4 occurs between the right-eye estimation image EMR' and the left-eye estimation image EML'. Referring to Equation 12, the distance between the viewer and the barrier panel BP is 4d.

Equation 12 is applied to obtain the distance between the viewer and the barrier panel BP when the barrier panel BP is operated in the second mode, but Equation 12 may be applied to obtain the distance between the viewer and the barrier panel BP when the barrier panel BP is operated in the third mode.

Referring to Equation 4, no upper limit exists on the range in which the barrier panel BP is operated in the third mode. However, the distance between the viewer and the barrier panel BP should be less than 4d such that the viewer perceives at least 50 percent of the 3D image.

Referring to back FIGS. 6 and 13, the brightness of the image displayed in the display panel DP when the barrier panel BP is operated in the first mode may be the same as the brightness of the image displayed in the display panel DP when the barrier panel BP is operated in the third mode. Because the first light transmitting portion TL1 and the third light transmitting portion TL3 have the same area in the barrier panel BP, the viewer may perceive the image having the same brightness level when the barrier panel BP is operated in the first mode and the third mode.

Referring to FIG. 4 again, the barrier panel BP may be operated in the first mode or the second mode when the distance between the viewer and the barrier panel BP satisfies the following Equation 13.

$$d + \frac{E \times d}{W - d} < \frac{8d}{5} < h < 2d \qquad \text{Equation 13}$$

An order of priority between the first mode and the second mode and an order of priority between the first mode and the third mode are as described with reference to FIGS. 2 to 4, and thus details thereof will be omitted.

Referring to Equation 13, the operation mode, e.g., the second and third modes, of the barrier panel BP is not determined by only the rate of the 3D image perceived by the viewer. In the range decided by Equation 13, when the barrier panel BP is operated in the second mode, the rate of the 3D image perceived by the viewer is less than the rate of the 3D image perceived by the viewer when the barrier panel BP is operated in the third mode. However, more crosstalk occurs when the barrier panel BP is operated in the second mode than when the barrier panel BP is operated in the third mode. Accordingly, although the barrier panel BP is operated in any of the second and third modes within the range defined by Equation 13, the quality of the 3D image perceived by the viewer may be uniform.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A 3D image display device comprising:
    a position detector configured to detect a position of a viewer and to generate a selection signal comprising information about the position of the viewer;
    a display panel comprising a plurality of pixels and configured to alternately display a left-eye image and a right-eye image in a first direction;
    a barrier panel disposed corresponding to the display panel and comprising a light transmitting portion and a light blocking portion; and
    a barrier panel controller configured to control the barrier panel in response to the selection signal,
    wherein the barrier panel is configured to operate in a first mode during which the light transmitting portion has a second width in the first direction and the light blocking portion has a third width in the first direction, a second mode during which the light transmitting portion has a first width corresponding to half of the second width in the first direction and the light blocking portion has a fourth width in the first direction which is greater than the third width, or a third mode during which the light transmitting portion has the first width in the first direction and the light blocking portion has a fifth width in the first direction which is less than the third width.

2. The 3D image display device of claim 1, wherein an appropriate visible distance is defined on a straight line extending in a direction normal to an upper surface of the barrier panel, a width in the first direction of one pixel is recognized through the light transmitting portion having the first width at any one point on the appropriate visible distance, and a width in the first direction of two pixels is recognized through the light transmitting portion having the second width at the any one point on the appropriate visible distance.

3. The 3D image display device of claim 2, wherein the first width is determined by the following Equation 1, $$s1 = \frac{E \times p}{E + 2p}, \qquad \text{Equation 1}$$

where s1 denotes the first width, E denotes a distance between a left eye and a right eye of the viewer, and p denotes a width in the first direction of the one pixel.

4. The 3D image display device of claim 2, wherein the barrier panel is operated in the first mode when a distance between the viewer and the barrier panel satisfies the following Equation 2, $$d - \frac{E \times d}{W + d} \le h \le d + \frac{E \times d}{W - d}, \qquad \text{Equation 2}$$

where h denotes the distance between the viewer and the barrier panel, d denotes the appropriate visible distance, E denotes a distance between a left eye and a right eye of the viewer, and W denotes a width in the first direction of the pixels.

5. The 3D image display device of claim 4, wherein, in the first mode, the third width is the same as the second width.

6. The 3D image display device of claim 5, wherein, in the first mode, the display panel is configured to alternately display the left-eye image and the right-eye image in a unit of two adjacent pixel columns.

7. The 3D image display device of claim 2, wherein the barrier panel is configured to operate in the second mode when a distance between the viewer and the barrier panel satisfies the following Equation 3 or Equation 4, $$h < d - \frac{E \times d}{W+E} \quad \text{Equation 3}$$

$$d + \frac{E \times d}{W-E} < h \le \frac{8d}{5}, \quad \text{Equation 4}$$

where h denotes the distance between the viewer and the barrier panel, d denotes the appropriate visible distance, E denotes a distance between a left eye and a right eye of the viewer, and W denotes a width in the first direction of the pixels.

8. The 3D image display device of claim 7, wherein, in the second mode, the width in the first direction of the light blocking portion is three times greater than the first width.

9. The 3D image display device of claim 8, wherein, in the second mode, an image displayed in the display panel has a brightness two times greater than a brightness of an image displayed in the display panel when the barrier panel is configured to operate in the first mode.

10. The 3D image display device of claim 8, wherein, in the second mode, the left eye recognizes half of the right-eye image or less while the right eye recognizes only the right-eye image, or the right eye recognizes half of the left-eye image or less while the left eye recognizes only the left-eye image.

11. The 3D image display device of claim 8, wherein, in the second mode, the display panel is configured to be divided corresponding to one of the right eye or the left eye of the viewer in a unit of control width determined by the following Equation 5 to control a display order of the left-eye image and the right-eye image in every each control width, $$k = \frac{h \times E}{2(h-d)}, \quad \text{Equation 5}$$

where k denotes the control width, h denotes a distance between the viewer and the barrier panel, E denotes a distance between the left eye and the right eye, and d denotes the appropriate visible distance.

12. The 3D image display device of claim 11, wherein, in the second mode, the display panel is configured to alternately display the left-eye image and the right-eye image in a unit of two adjacent pixel columns within the control width.

13. The 3D image display device of claim 11, wherein, in the second mode, the appropriate visible image comprising first, second, third, and fourth appropriate visible images respectively corresponding to images displayed in first, second, third, and fourth pixel columns, respectively, and when center lines cross center portions of two adjacent appropriate visible images among the first to fourth appropriate visible images, respectively, a boundary between two adjacent control widths is determined by projecting the center lines onto an upper surface of the display panel in the right eye or the left eye.

14. The 3D image display device of claim 11, wherein, in the second mode, the left-eye image comprises a first left-eye image and a second left-eye image, each of which is displayed through one pixel column, the right-eye image comprising a first right-eye image and a second right-eye image, each of which is displayed through one pixel column, the display panel comprising first, second, third, and fourth pixel columns, which are adjacent to each other and repeated in a unit of four pixel columns, and each of the first right-eye image, the second right-eye image, the first left-eye image, and the second left-eye image are sequentially shifted by one pixel column in the first direction in every control width.

15. The 3D image display device of claim 2, wherein, the barrier panel is configured to operate in the third mode when a distance between the viewer and the barrier panel satisfies the following Equation 6, $$d + \frac{E \times d}{W-E} < 2d \le h, \quad \text{Equation 6}$$

where h denotes the distance between the viewer and the barrier panel, d denotes the appropriate visible distance, E denotes a distance between a left eye and a right eye of the viewer, and W denotes a width in the first direction of the pixels.

16. The 3D image display device of claim 15, wherein, in the third mode, the fifth width is the same as the first width.

17. The 3D image display device of claim 16, wherein a brightness of an image displayed in the display panel when the barrier panel is configured to operate in the first mode is the same as a brightness of an image displayed in the display panel when the barrier panel is configured to operate in the third mode.

18. The 3D image display device of claim 16, wherein, in the third mode, the display panel is configured to be divided corresponding to one of the right eye or the left eye of the viewer in a unit of control width determined by the following Equation 7 to control a display order of the left-eye image and the right-eye image in every each control width $$k = \frac{h \times E}{2(h-d)}. \quad \text{Equation 5}$$

19. The 3D image display device of claim 18, wherein, in the third mode, the display panel is configured to alternately display the left-eye image and the right-eye image in a unit of two adjacent pixel columns within the control width.

20. The 3D image display device of claim 18, wherein, in the third mode, the appropriate visible image comprising a left-eye appropriate visible image corresponding to the left-eye image and a second appropriate visible image corresponding to the right-eye image, and the control width is determined by projecting a width in the first direction of the right-eye appropriate visible image or a width in the first direction of the left-eye appropriate visible image onto the upper surface of the display panel from the right eye of the viewer or is determined by projecting the width in the first direction of the right-eye appropriate visible image or the width in the first direction of the left-eye appropriate visible image onto the upper surface of the display panel from the left eye of the viewer.

21. The 3D image display device of claim 18, wherein, in the third mode, the left-eye image comprises a first left-eye image and a second left-eye image, each of which is displayed through one pixel column, the right-eye image comprising a first right-eye image and a second right-eye image, each of which is displayed through one pixel column, the display panel comprising first, second, third, and fourth pixel columns, which are adjacent to each other and repeated in a unit of four pixel columns, and each of the first right-eye image, the second right-eye image, the first left-eye image, and the second left-eye image is sequentially shifted by one pixel column to the first direction in every control width.

22. The 3D image display device of claim 2, wherein the barrier panel is configured to operate in one of the second mode and the third mode when a distance between the viewer and the barrier panel satisfies the following Equation 8

$$d + \frac{E \times d}{W - d} < \frac{8d}{5} < h < 2d. \qquad \text{Equation 8}$$

23. The 3D image display device of claim 1, wherein the barrier panel controller is configured to control the position of the light transmitting portion and the light blocking portion in the first direction to correspond to the viewer when the viewer moves in the first direction.

24. The 3D image display device of claim 23, wherein the barrier panel controller is configured to move the light transmitting portion and the light blocking portion to the first direction by s1/2 or s2/4, where s1 denotes the first width and the s2 denotes the second width.

25. A 3D image display device comprising:
a position detector configured to detect a position of a viewer and to generate a selection signal comprising information about the position of the viewer;
a display panel comprising a plurality of pixels and configured to alternately display a left-eye image and a right-eye image in a first direction;
a barrier panel disposed corresponding to the display panel and comprising a light transmitting portion and a light blocking portion; and
a barrier panel controller configured to control the barrier panel in response to the selection signal so as to vary a width of the light transmitting portion and a width of the light blocking portion in the first direction,
wherein the barrier panel is configured to operate in a first mode during which the light transmitting portion has a second width in the first direction, a second mode during which the light transmitting portion has a first width corresponding to half of the second width in the first direction and the light blocking portion has a width three times greater than the first width in the first direction, or a third mode during which the light transmitting portion has the first width in the first direction and the light blocking portion has a same width in the first direction as the light transmitting portion.

26. The 3D image display device of claim 1, wherein a brightness of the image displayed in the display panel when the barrier panel is operated in the second mode is twice as great as a brightness of the image displayed in the display panel when the barrier panel is operated in the first mode.

27. The 3D image display device of claim 25, wherein a brightness of the image displayed in the display panel when the barrier panel is operated in the second mode is twice as great as a brightness of the image displayed in the display panel when the barrier panel is operated in the first mode.

* * * * *